United States Patent
Tsai et al.

(10) Patent No.: US 12,553,893 B2
(45) Date of Patent: Feb. 17, 2026

(54) MULTIPLEX COMPETITION ASSAY FOR PROFILING BINDING EPITOPES OF AFFINITY AGENTS FOR CLINICAL DIAGNOSTICS USE

(71) Applicant: ENABLE BIOSCIENCES INC., South San Francisco, CA (US)

(72) Inventors: Cheng-Ting Tsai, South San Francisco, CA (US); Peter Robinson, South San Francisco, CA (US)

(73) Assignee: Enable Biosciences Inc., South San Francisco, CA (US)

( * ) Notice: Subject to any disclaimer, the term of this patent is extended or adjusted under 35 U.S.C. 154(b) by 1016 days.

(21) Appl. No.: 17/594,113

(22) PCT Filed: Mar. 20, 2020

(86) PCT No.: PCT/US2020/023811
§ 371 (c)(1),
(2) Date: Oct. 1, 2021

(87) PCT Pub. No.: WO2020/251646
PCT Pub. Date: Dec. 17, 2020

(65) Prior Publication Data
US 2022/0155300 A1 May 19, 2022

Related U.S. Application Data

(60) Provisional application No. 62/859,918, filed on Jun. 11, 2019.

(51) Int. Cl.
G01N 33/569 (2006.01)
C12Q 1/70 (2006.01)
G01N 33/543 (2006.01)

(52) U.S. Cl.
CPC ....... *G01N 33/56983* (2013.01); *C12Q 1/701* (2013.01); *G01N 33/54306* (2013.01); *G01N 33/54366* (2013.01); *C12Q 2600/16* (2013.01); *G01N 2333/9015* (2013.01); *G01N 2458/10* (2013.01)

(58) Field of Classification Search
CPC ....... G01N 33/56983; G01N 33/54306; G01N 2333/9015; C12Q 1/701; C12Q 2600/16
See application file for complete search history.

(56) References Cited

U.S. PATENT DOCUMENTS

2008/0113339 A1   5/2008  Rodgers et al.
2015/0023568 A1   1/2015  Lacey et al.

FOREIGN PATENT DOCUMENTS

| CN | 107894508 A | 4/2018 |
| WO | WO 2012/104261 A1 | 8/2012 |
| WO | WO 2013/155617 A1 | 10/2013 |
| WO | WO 2018/183779 A1 | 10/2018 |

OTHER PUBLICATIONS

International Search Report and Written Opinion mailed Jun. 24, 2020 in International Application No. PCT/US2020/023811.
Abdiche et al., "Exploring blocking assays using Octet, ProteOn, and Biacore biosensors", Anal Biochem. 386(2):172-80, 2009.
Ahmad et al., "B-cell epitope mapping for the design of vaccines and effective diagnostics", Trials in Vaccinology. 5, 71-83, 2016.
Chen et al., "Structural Basis for Antigen Recognition by Transglutaminase 2-specific Autoantibodies in Celiac Disease", J Biol Chem. 290(35):21365-21375, 2015.
Cho et al., "Structure of the extracellular region of HER2 alone and in complex with the Herceptin Fab.", Nature. 421(6924):756-60, 2003.
Greenbaum et al., "Insulin antibodies and insulin autoantibodies", Diabetes Medicine. 8(2): 97-105, 1991.
Hutchings et al., "Therapeutic antibodies directed at G protein-coupled receptors", MAbs. 2(6):594-606, 2010.
Kwak et al., "A convenient method for epitope competition analysis of two monoclonal antibodies for their antigen binding", J Immunol Methods. 191(1):49-54, 1996.
Ladner, "Mapping the Epitopes of Antibodies", Biotechnology and Genetic Engineering Reviews. 24:1-30, 2007.
Lee et al., "Identification of diagnostic peptide regions that distinguish Zika virus from related mosquito-borne Flaviviruses", PLoS One. 12(5):e0178199, 2017.
Lessler et al., "Assessing the global threat from Zika virus", Science.353: aaf8160, 2016.
Lundberg et al., "Homogeneous antibody-based proximity extension assays provide sensitive and specific detection of low-abundant proteins in human blood", Nucleic Acids Research, 39(15): e102, 2011.
Midoro-Horiuti et al., "Epitope mapping with Random Phage Display Library", Monoclonal Antibodies: Methods and Protocols, Methods in Molecular Biology, vol. 1131, 2014.
Mishra et al., "Diagnosis of Zika Virus Infection by Peptide Array and Enzyme-Linked Immunosorbent Assay", MBio. 6;9(2). pii: e00095-18, 2018.

(Continued)

*Primary Examiner* — Nicole Kinsey White
*Assistant Examiner* — Ruixue Wang
(74) *Attorney, Agent, or Firm* — Knobbe Martens Olson & Bear LLP

(57) ABSTRACT

Some embodiments of the systems and methods provided herein relate to an assay. Some such embodiments include multiplex affinity probes and an antigen probe. multiplex affinity probes and an antigen probe Some embodiments include contacting a biological sample with the probes, wherein target binding agents such as antibodies in the biological sample compete away the multiplex affinity probes from binding to the antigen probe. Some such embodiments include detecting a decrease in binding of the multiplex affinity probes to the antigen probe, thereby indicating the presence or an amount of the target binding agents in the biological sample.

17 Claims, 7 Drawing Sheets
Specification includes a Sequence Listing.

(56) References Cited

OTHER PUBLICATIONS

Moreira et al., "Epitope Mapping by Phage Display", Methods Mol Biol. 1701:497-518, 2018.
Mousa et al., "Structural basis for nonneutralizing antibody competition at antigenic site II of the respiratory syncytial virus fusion protein", Proc Natl Acad Sci U S A. 113(44):E6849-E6858, 2016.
Opuni et al., "Mass spectrometric epitope mapping", Mass Spectrom Rev. 37(2):229-241, 2018.
Spinelli et al., "Immunogenicity of anti-tumour necrosis factor drugs in rheumatic diseases", Clin Exp Rheumatol 31: 954-963, 2013.
Wilkinson et al., "History and origin of the HIV-1 subtype C epidemic in South Africa and the greater southern African region", Sci Rep 5:16897, 2015.
Extended European Search Report in European Application No. 20821629.1 mailed May 24, 2023 in 28 pages.

MULTIPLEX COMPETITION ASSAY FOR PROFILING BINDING EPITOPES OF AFFINITY AGENTS FOR CLINICAL DIAGNOSTICS USE

RELATED APPLICATIONS

The present application is a U.S. National Phase application under 35 U.S.C. § 371 of International Application No. PCT/US2020/023811, filed on Mar. 20, 2020, designating the United States and published in the English language, which claims the benefit of U.S. Provisional Application No. 62/859,918 filed on Jun. 11, 2019, the entire disclosure of each of which is incorporated herein by reference.

REFERENCE TO SEQUENCE LISTING

The present application is being filed along with a Sequence Listing in electronic format. The Sequence Listing is provided as a file entitled SeqListing_ENBIO002NP.TXT, which was created and last modified on Oct. 1, 2021, which is 1,573 bytes in size. The information in the electronic Sequence Listing is hereby incorporated by reference in its entirety.

FIELD

Aspects of the present invention concern systems and methods utilizing multiplex affinity probes and an antigen probe. Some embodiments include contacting a biological sample with said probes, wherein target binding agents in the biological sample compete with the multiplex affinity probes for binding sites on the antigen probe.

BACKGROUND

Detection of target binding agents such as antibodies in a biological sample may be beneficial for a wide array of applications. The need for improved assays, which detect target binding agents is manifest.

SUMMARY

Some embodiments relate to an assay system. In some embodiments, the assay system comprises: a first multiplex affinity probe comprising a first affinity binding agent and a first detectable probe; a second multiplex affinity probe comprising a second affinity binding agent and a second detectable probe; and/or an antigen probe comprising a first epitope recognizable by the first affinity binding agent, a second epitope recognizable by the second affinity binding agent, and a third detectable probe.

In some embodiments of the assay system, the antigen probe comprises a recombinant protein comprising the first and second epitopes. In some embodiments, the first and second epitopes each comprise a linear or conformational epitope. In some embodiments, the first and second affinity binding agents each comprise an antibody, nanobody, peptoid, or aptamer. In some embodiments, the first, second, and third detectable probes each comprise a bead, or a fluorescent peptide or both.

In some embodiments of the assay system, the first, second, and third detectable probes each comprise a nucleic acid such as a DNA barcode. Some embodiments include a first connector nucleic acid hybridizable to the DNA barcodes of the first and third detectable probes. In some embodiments, the first connector nucleic acid is hybridizable to the DNA barcode of the second detectable probe. Some embodiments include a second connector nucleic acid hybridizable to the DNA barcodes of the second and third detectable probes. Some embodiments include a ligase. In some embodiments, the DNA barcodes of the first and third detectable probes are complementary or each comprise a complementary region with each other. In some embodiments, the DNA barcodes of the second and third detectable probes are complementary or each comprise a complementary region with each other. Some embodiments include a DNA polymerase. In some embodiments, the DNA polymerase comprises 3' exonuclease activity. Some embodiments include an amplification primer specific for the DNA barcode of the first detectable probe. Some embodiments include an amplification primer specific for the DNA barcode of the second detectable probe. Some embodiments include an amplification primer specific for the DNA barcode of the third detectable probe.

In some embodiments of the assay system, the first and second multiplex affinity probes are each bound or conjugated to a solid support. In some embodiments, the first and second multiplex affinity probes are each bound or conjugated separate predetermined locations on the solid support. In some embodiments, the antigen probe is bound or conjugated to a solid support or substrate. In some embodiments, the solid support comprises a plate, a bead, a membrane, a polymer, a matrix, metal, plastic, ceramic, or glass or any combination thereof.

More embodiments relate to an assay method. In some embodiments, the assay method comprises: providing a first multiplex affinity probe comprising a first affinity binding agent and a first detectable probe; providing a second multiplex affinity probe comprising a second affinity binding agent and a second detectable probe; providing an antigen probe comprising a first epitope recognizable by the first affinity binding agent, a second epitope recognizable by the second affinity binding agent, and a third detectable probe; providing a biological sample suspected of comprising a first target antibody specific for the first epitope or a second target antibody specific for the second epitope; contacting the biological sample with the antigen probe, wherein the first target antibody binds to the first epitope to form a first target antibody epitope complex if the biological sample comprises the first target antibody, and wherein the second target antibody binds to the second epitope to form a second target antibody epitope complex if the biological sample comprises the second target antibody; contacting the biological sample with the first and second multiplex affinity probes, wherein the first multiplex affinity probe binds to the first epitope to form a first multiplex affinity probe epitope complex if the biological sample does not comprise the first target antibody, and wherein the second multiplex affinity probe binds to the second epitope to form a second multiplex affinity probe epitope complex if the biological sample does not comprise the second target antibody; or detecting the presence or absence of the first and second multiplex affinity probe epitope complexes or both.

Some embodiments of the assay method include removing any unbound target antibodies or multiplex affinity probes prior to detecting the presence or absence of the first and second multiplex affinity probe epitope complexes. In some embodiments, detecting the presence or absence of the first and second multiplex affinity probe epitope complexes comprises detecting the presence or absence of the first and second detectable probes. In some embodiments, the presence or absence of the first and second multiplex affinity probe epitope complexes comprises performing flow cytometry, electrophoresis, imaging, or sequencing or any combination thereof.

In some embodiments of the assay method, the biological sample comprises the first target antibody or the second target antibody or both, wherein the first target antibody binds to the first epitope to form a first target antibody epitope complex and wherein the second target antibody binds to the second epitope to form a second target antibody epitope complex, wherein the first multiplex affinity probe binds to the first epitope to form a first multiplex affinity probe epitope complex or wherein the second multiplex affinity probe binds to the second epitope to form a second multiplex affinity probe epitope complex or both, and, wherein detecting the presence or absence of the first and second multiplex affinity probe epitope complexes comprises detecting the presence of the first or second multiplex affinity probe epitope complexes or both.

In some embodiments of the assay method, the antigen probe comprises a recombinant protein comprising the first and second epitopes. In some embodiments, the first and second epitopes each comprise a linear or conformational epitope. In some embodiments, the first and second affinity binding agents each comprise an antibody, nanobody, peptoid, or aptamer. In some embodiments, the first, second, and third detectable probes each comprise a bead, or a fluorescent peptide or both.

In some embodiments of the assay method, the first, second, and third detectable probes each comprise a nucleic acid such as a DNA barcode. Some embodiments include hybridizing the DNA barcodes of the first and third detectable probes with a first connector nucleic acid, wherein the first connector nucleic acid comprises sequences complementary to at least a portion of the DNA barcodes of the first and third detectable probes. Some embodiments include ligating the DNA barcodes of the first and third detectable probes together to form a first ligation product. Some embodiments include amplifying a region of the first ligation product using amplification primers specific for the DNA barcodes of the first and third detectable probes, to produce a first amplification product. Some embodiments include detecting or quantifying the first amplification product. Some embodiments include hybridizing the DNA barcodes of the second and third detectable probes with a second connector nucleic acid, wherein the second connector nucleic acid comprises sequences complementary to at least a portion of the DNA barcodes of the second and third detectable probes. Some embodiments include hybridizing the DNA barcodes of the second and third detectable probes with the first connector nucleic acid, wherein the first connector nucleic acid further comprises a sequence complementary to at least a portion of the DNA barcode of the second detectable probe. Some embodiments include ligating the DNA barcodes of the second and third detectable probes together to form a second ligation product. Some embodiments include amplifying a region of the second ligation product using amplification primers specific for the DNA barcodes of the second and third detectable probes, to produce a second amplification product. Some embodiments include detecting or quantifying the second amplification product. Some embodiments include hybridizing the DNA barcodes of the first and third detectable probes with each other, wherein the DNA barcodes of the first and third detectable probes are complementary or each comprise a complementary region with each other, and/or further comprising hybridizing the DNA barcodes of the second and third detectable probes with each other, wherein the DNA barcodes of the second and third detectable probes are complementary or each comprise a complementary region with each other. Some embodiments include contacting the DNA barcodes of the first and third detectable probes with a DNA polymerase, wherein the DNA polymerase forms a first double-stranded DNA molecule from the first and third detectable probes, and/or further comprising contacting the DNA barcodes of the second and third detectable probes with a DNA polymerase, wherein the DNA polymerase forms a second double-stranded DNA molecule from the second and third detectable probes. In some embodiments, the DNA polymerase comprises 3' exonuclease activity. Some embodiments include amplifying the first double stranded DNA molecule to produce a first amplification product, and/or further comprising amplifying the second double stranded DNA molecule to produce a second amplification product. Some embodiments include detecting or quantifying the first amplification product, or further comprising detecting or quantifying the second amplification product or both.

In some embodiments of the assay system, the first and second multiplex affinity probes are each bound or conjugated to a solid support. In some embodiments, the first and second multiplex affinity probes are each bound or conjugated separate predetermined locations on the solid support. In some embodiments, the antigen probe is bound or conjugated to a solid support or substrate. In some embodiments, the solid support comprises a plate, a bead, a membrane, a polymer, a matrix, metal, plastic, ceramic, or glass or any combination thereof. In some embodiments, the presence of the first or second target antibodies in the biological sample are indicative of the presence of a disease.

In some embodiments of the assay system, the disease comprises dengue virus or Zika virus. In some embodiments, the biological sample is from a subject such as a mammal or human. In some embodiments, the biological sample comprises whole blood, serum, plasma, urine, saliva, breast milk, nasal fluids, or cerebrospinal fluid or any combination thereof.

Some embodiments include one or more of the alternatives described below:

1. An assay system, comprising:
   a first multiplex affinity probe comprising a first affinity binding agent and a first detectable probe;
   a second multiplex affinity probe comprising a second affinity binding agent and a second detectable probe; and
   an antigen probe comprising a first epitope recognizable by the first affinity binding agent, a second epitope recognizable by the second affinity binding agent, and a third detectable probe.

2. The assay system of alternative 1, wherein the antigen probe comprises a recombinant protein comprising the first and second epitopes.

3. The assay system of alternative 1 or 2, wherein the first and second epitopes each comprise a linear or conformational epitope.

4. The assay system of any of alternatives 1-3, wherein the first and second affinity binding agents each comprise an antibody, nanobody, peptoid, or aptamer or any combination thereof.

5. The assay system of any of alternatives 1-4, wherein the first, second, and third detectable probes each comprise a bead, or a fluorescent peptide or both.

6. The assay system of any of alternatives 1-5, wherein the first, second, and third detectable probes each comprise a nucleic acid such as a DNA barcode.

7. The assay system of alternative 6, further comprising a first connector nucleic acid hybridizable to the DNA barcodes of the first and third detectable probes.
8. The assay system of alternative 7, wherein the first connector nucleic acid is hybridizable to the DNA barcode of the second detectable probe.
9. The assay system of alternative 8, further comprising a second connector nucleic acid hybridizable to the DNA barcodes of the second and third detectable probes.
10. The assay system of any of alternatives 6-9, further comprising a ligase.
11. The assay system of alternative 6, wherein the DNA barcodes of the first and third detectable probes are complementary or each comprise a complementary region with each other.
12. The assay system of alternative 11, wherein the DNA barcodes of the second and third detectable probes are complementary or each comprise a complementary region with each other.
13. The assay system of alternative 11 or 12, further comprising a DNA polymerase.
14. The assay system of alternative 13, wherein the DNA polymerase comprises 3' exonuclease activity.
15. The assay system of any of alternatives 6-14, further comprising an amplification primer specific for the DNA barcode of the first detectable probe.
16. The assay system of any of alternatives 6-15, further comprising an amplification primer specific for the DNA barcode of the second detectable probe.
17. The assay system of any of alternatives 6-16, further comprising an amplification primer specific for the DNA barcode of the third detectable probe.
18. The assay system of any of alternatives 1-17, wherein the first and second multiplex affinity probes are each bound or conjugated to a solid support.
19. The assay system of alternative 18, wherein the first and second multiplex affinity probes are each bound or conjugated separate predetermined locations on the solid support.
20. The assay system of any of alternatives 1-19, wherein the antigen probe is bound or conjugated to a solid support or substrate.
21. The assay system of any of alternatives 18-20, wherein the solid support comprises a plate, a bead, a membrane, a polymer, a matrix, metal, plastic, ceramic, or glass or any combination thereof.
22. An assay method, comprising:
    providing a first multiplex affinity probe comprising a first affinity binding agent and a first detectable probe;
    providing a second multiplex affinity probe comprising a second affinity binding agent and a second detectable probe;
    providing an antigen probe comprising a first epitope recognizable by the first affinity binding agent, a second epitope recognizable by the second affinity binding agent, and a third detectable probe;
    providing a biological sample suspected of comprising a first target antibody specific for the first epitope or a second target antibody specific for the second epitope;
    contacting the biological sample with the antigen probe, wherein the first target antibody binds to the first epitope to form a first target antibody epitope complex if the biological sample comprises the first target antibody, and wherein the second target antibody binds to the second epitope to form a second target antibody epitope complex if the biological sample comprises the second target antibody;
    contacting the biological sample with the first and second multiplex affinity probes, wherein the first multiplex affinity probe binds to the first epitope to form a first multiplex affinity probe epitope complex if the biological sample does not comprise the first target antibody, and wherein the second multiplex affinity probe binds to the second epitope to form a second multiplex affinity probe epitope complex if the biological sample does not comprise the second target antibody; and
    detecting the presence or absence of the first and second multiplex affinity probe epitope complexes.
23. The assay method of alternative 22, further comprising removing any unbound target antibodies or multiplex affinity probes prior to detecting the presence or absence of the first and second multiplex affinity probe epitope complexes.
24. The assay method of alternative 22 or 23, wherein detecting the presence or absence of the first and second multiplex affinity probe epitope complexes comprises detecting the presence or absence of the first and second detectable probes.
25. The assay method of any of alternatives 22-24, wherein detecting the presence or absence of the first and second multiplex affinity probe epitope complexes comprises performing flow cytometry, electrophoresis, imaging, or sequencing or any combination thereof.
26. The assay method of any of alternatives 22-25, wherein the biological sample comprises the first target antibody or the second target antibody or both, wherein the first target antibody binds to the first epitope to form a first target antibody epitope complex and wherein the second target antibody binds to the second epitope to form a second target antibody epitope complex, wherein the first multiplex affinity probe binds to the first epitope to form a first multiplex affinity probe epitope complex or wherein the second multiplex affinity probe binds to the second epitope to form a second multiplex affinity probe epitope complex or both, and wherein detecting the presence or absence of the first and second multiplex affinity probe epitope complexes comprises detecting the presence of the first or second multiplex affinity probe epitope complexes or both.
27. The assay method of any of alternatives 22-26, wherein the antigen probe comprises a recombinant protein comprising the first and second epitopes.
28. The assay method of any of alternatives 22-27, wherein the first and second epitopes each comprise a linear or conformational epitope.
29. The assay method of any of alternatives 22-28, wherein the first and second affinity binding agents each comprise an antibody, nanobody, peptoid, or aptamer or any combination thereof.
30. The assay method of any of alternatives 22-29, wherein the first, second, and third detectable probes each comprise a bead, or a fluorescent peptide or both.
31. The assay method of any of alternatives 22-30, wherein the first, second, and third detectable probes each comprise a nucleic acid such as a DNA barcode.
32. The assay method of alternative 31, further comprising hybridizing the DNA barcodes of the first and third detectable probes with a first connector nucleic acid, wherein the first connector nucleic acid comprises sequences complementary to at least a portion of the DNA barcodes of the first and third detectable probes.

33. The assay method of alternative 32, further comprising ligating the DNA barcodes of the first and third detectable probes together to form a first ligation product.
34. The assay method of alternative 33, further comprising amplifying a region of the first ligation product using amplification primers specific for the DNA barcodes of the first and third detectable probes, to produce a first amplification product.
35. The assay method of alternative 34, further comprising detecting or quantifying the first amplification product.
36. The assay method of any of alternatives 31-35, further comprising hybridizing the DNA barcodes of the second and third detectable probes with a second connector nucleic acid, wherein the second connector nucleic acid comprises sequences complementary to at least a portion of the DNA barcodes of the second and third detectable probes.
37. The assay method of any of alternatives 31-35, further comprising hybridizing the DNA barcodes of the second and third detectable probes with the first connector nucleic acid, wherein the first connector nucleic acid further comprises a sequence complementary to at least a portion of the DNA barcode of the second detectable probe.
38. The assay method of alternative 36 or 37, further comprising ligating the DNA barcodes of the second and third detectable probes together to form a second ligation product.
39. The assay method of alternative 38, further comprising amplifying a region of the second ligation product using amplification primers specific for the DNA barcodes of the second and third detectable probes, to produce a second amplification product.
40. The assay method of alternative 39, further comprising detecting or quantifying the second amplification product.
41. The assay method of alternative 31, further comprising hybridizing the DNA barcodes of the first and third detectable probes with each other, wherein the DNA barcodes of the first and third detectable probes are complementary or each comprise a complementary region with each other, or further comprising hybridizing the DNA barcodes of the second and third detectable probes with each other or both, wherein the DNA barcodes of the second and third detectable probes are complementary or each comprise a complementary region with each other.
42. The assay method of alternative 41, further comprising contacting the DNA barcodes of the first and third detectable probes with a DNA polymerase, wherein the DNA polymerase forms a first double-stranded DNA molecule from the first and third detectable probes, or further comprising contacting the DNA barcodes of the second and third detectable probes with a DNA polymerase or both, wherein the DNA polymerase forms a second double-stranded DNA molecule from the second and third detectable probes.
43. The assay method of alternative 42, wherein the DNA polymerase comprises 3' exonuclease activity.
44. The assay method of alternative 42 or 43, further comprising amplifying the first double stranded DNA molecule to produce a first amplification product, and/or further comprising amplifying the second double stranded DNA molecule to produce a second amplification product.
45. The assay method of alternative 44, further comprising detecting or quantifying the first amplification product, and/or further comprising detecting or quantifying the second amplification product.
46. The assay method of any of alternatives 22-45, wherein the first and second multiplex affinity probes are each bound or conjugated to a solid support.
47. The assay method of alternative 46, wherein the first and second multiplex affinity probes are each bound or conjugated separate predetermined locations on the solid support.
48. The assay method of any of alternatives 22-47, wherein the antigen probe is bound or conjugated to a solid support or substrate.
49. The assay method of any of alternatives 40-48, wherein the solid support comprises a plate, a bead, a membrane, a polymer, a matrix, metal, plastic, ceramic, or glass or any combination thereof.
50. The assay method of any of alternatives 22-49, wherein the presence of the first or second target antibodies in the biological sample are indicative of the presence of a disease.
51. The assay method of alternative 50, wherein the disease comprises dengue virus or Zika virus.
52. The assay method of any of alternatives 22-51, wherein the biological sample is from a subject such as a mammal or human.
53. The assay method of any of alternatives 22-52, wherein the biological sample comprises whole blood, serum, plasma, urine, saliva, breast milk, nasal fluids, or cerebrospinal fluid or any combination thereof.

DETAILED DESCRIPTION

Described herein are systems and methods for a diagnostic multiplex competition assay. Some embodiments utilize a peptide antigen conjugated with a DNA primer and an antibody specific for the antigen also conjugated to a DNA primer. The primer conjugated antigen and primer conjugated antibody may be added to a biological sample, such as a sample from a patient e.g., whole blood, serum, plasma, urine, saliva, breast milk, nasal fluids, or cerebrospinal fluid, in the presence of a ligase and/or a polymerase and amplification primers e.g., primers specific for the ligated primers generated by the fusion of the two conjugated DNA primers. The assay has benefits over prior art assays in its ability to detecting target binding agents, be multiplexed, and detect epitopes in various three-dimensional conformations.

Figure 1:
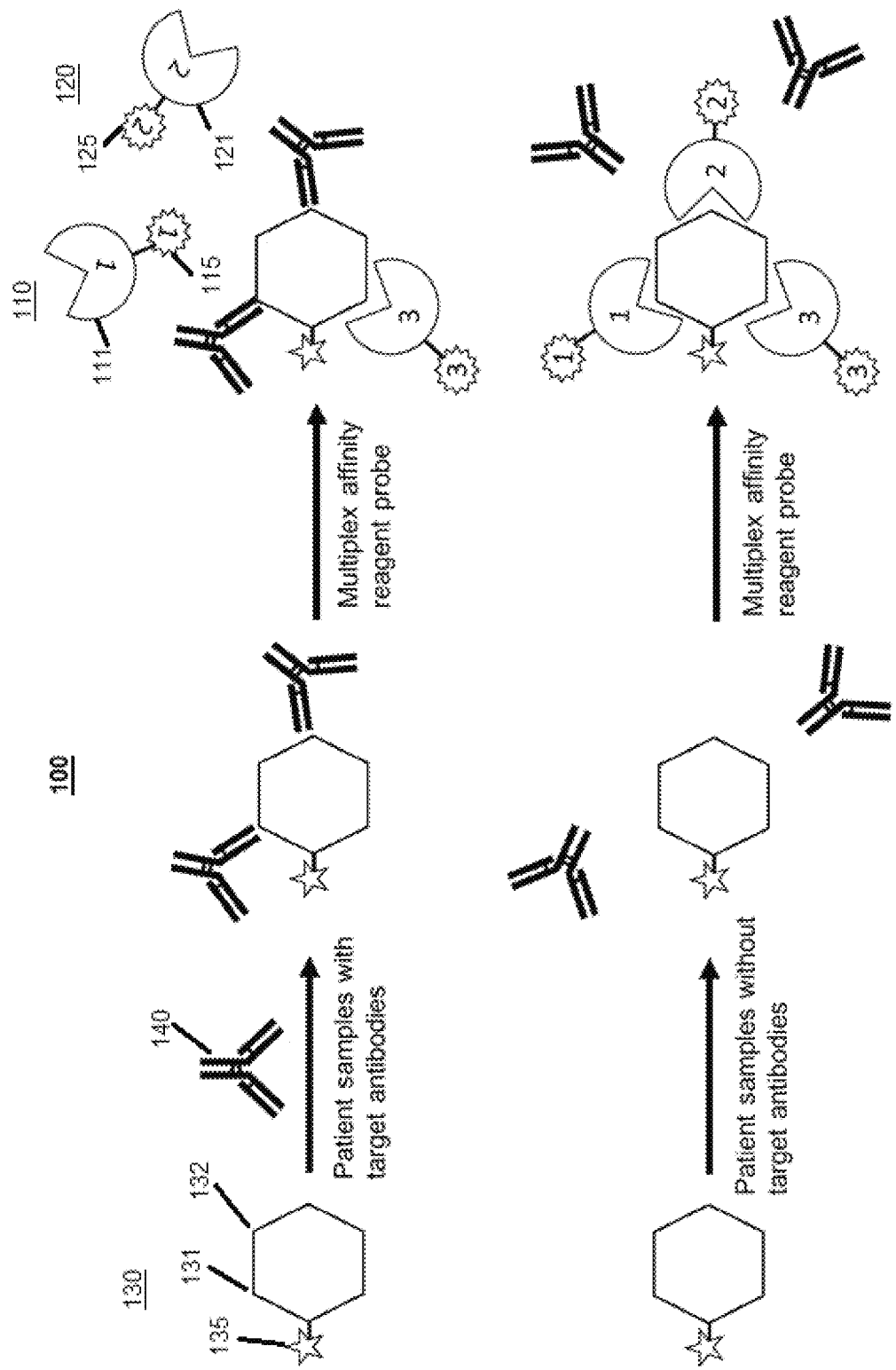
FIG. 1 is a diagram showing general concepts of some embodiments of the methods and systems described herein.

Some embodiments include an assay system such as the assay system 100 shown in FIG. 1. In some embodiments, the assay system includes a first multiplex affinity probe 110 comprising a first affinity binding agent 111 and a first detectable probe 115. In some embodiments, the assay system includes a second multiplex affinity probe 120 comprising a second affinity binding agent 121 and a second detectable probe 125. In some embodiments, the assay system includes an antigen probe 130 comprising a first epitope 131 recognizable by the first affinity binding agent, a second epitope 132 recognizable by the second affinity binding agent, and a third detectable probe 135. The assay system may be used as a competitive assay for the detection of target binding agents such as target antibodies 140 in some approaches.

Some embodiments include an assay method, which comprises the use of an assay system described herein. In some embodiments, the assay method includes providing a first multiplex affinity probe comprising a first affinity binding agent and a first detectable probe. In some embodiments, the assay method includes providing a second multiplex affinity probe comprising a second affinity binding agent and a second detectable probe. In some embodiments, the assay method includes providing an antigen probe comprising a first epitope recognizable by the first affinity binding agent, a second epitope recognizable by the second affinity binding agent, and a third detectable probe. In some embodiments, the assay method includes providing a biological sample, e.g., whole blood, serum, plasma, urine, saliva, breast milk, nasal fluids, or cerebrospinal fluid, suspected of comprising a first target antibody specific for the first epitope or a second target antibody specific for the second epitope. In some embodiments, the assay method includes contacting the biological sample, e.g., whole blood, serum, plasma, urine, saliva, breast milk, nasal fluids, or cerebrospinal fluid, with the antigen probe, wherein the first target antibody binds to the first epitope to form a first target antibody epitope complex if the biological sample comprises the first target antibody, and wherein the second target antibody binds to the second epitope to form a second target antibody epitope complex if the biological sample comprises the second target antibody. In some embodiments, the assay method includes contacting the biological sample, e.g., whole blood, serum, plasma, urine, saliva, breast milk, nasal fluids, or cerebrospinal fluid, with the first and second multiplex affinity probes, wherein the first multiplex affinity probe binds to the first epitope to form a first multiplex affinity probe epitope complex if the biological sample does not comprise the first target antibody, and wherein the second multiplex affinity probe binds to the second epitope to form a second multiplex affinity probe epitope complex if the biological sample does not comprise the second target antibody. In some embodiments, the assay method includes detecting the presence or absence of the first and second multiplex affinity probe epitope complexes.

Traditional immunoassay-based epitope profiling methods employ a set of peptides as probes, wherein each peptide represents a unique epitope. Since the peptides lack conformational structures, these approaches often fail to detect disease relevant conformational epitopes.

In contrast, some embodiments of the systems and methods described herein include a set of affinity binding agents (e.g. antibodies, nanobodies, peptoids, or aptamers) as probes to detect conformational epitopes (see FIG. 1). Since each of the affinity binding agents can bind onto a unique epitope on intact antigens, the epitopes recognized in the assays of some embodiments are more likely to be disease relevant conformational epitopes. Furthermore, in order to accomplish multiplex profiling, some embodiments include barcoding the affinity binding agents in any one of several different manners.

A difference between some embodiments of the methods and systems described herein and other methods and systems is that in some embodiments of the systems and methods described herein the affinity binding agents can bind onto both linear and conformational epitopes, and as such they can readily detect conformational epitopes. In other words, instead of using peptides to define epitopes, the systems and methods described herein may use affinity binding agents against the epitope to define both linear and conformational epitopes. This is a unique aspect of some embodiments of the assay described herein.

Competition assays may be used to discriminate whether two therapeutic antibodies bind onto the same epitope [12]. Competition assays may also be used to study competition of binding between therapeutic antibodies and natural antibodies from patient against the drug targets [13]. However, prior art assays such as ELISAs have used singleplex approaches to study the competition of binding. There is great need to further develop multiplex approaches for uses such as epitope mapping. Competition methods may be used for such purposes.

To achieve multiplex competition assay for multiple conformational epitopes, an antigen of interest may first be selected. Then, a set of affinity binding agents against that antigen may be identified. The affinity binding agents may then barcoded so that we can differentiate their signals in a single assay. Then, the antigen of interest may be incubated with patient samples, e.g., whole blood, serum, plasma, urine, saliva, breast milk, nasal fluids, or cerebrospinal fluid. Then, the barcoded library of affinity binding agents may be further contacted with previous mixtures. If there are antibodies against epitopes of interest within patient samples, those antibodies may occupy the binding site on the antigen and prevent barcoded affinity binding agent from binding onto the epitopes. As such, the presence of the target antibodies may compete off binding from affinity agents. Then, the change of signals from the affinity agents may be assayed.

FIG. 1 shows a diagram of some embodiments of multiplex competition assays. Some embodiments include first incubating the antigen probes with patients samples, e.g., whole blood, serum, plasma, urine, saliva, breast milk, nasal fluids, or cerebrospinal fluid, and then adding multiplex affinity probes for detection of interactions. In some cases where a patient sample contains target antibodies, the target antibodies preclude a portion of the multiplex affinity from engaging with the antigens, thus leading to a change of signal intensities such as a decrease in signal intensities (see upper panel of FIG. 1). In some cases where a patient sample does not contain target antibodies, the multiplex affinity probes can successfully engage with antigens, thus leading to strong signals (see lower panel of FIG. 1). The antigen may have one probe on it. The multiplex affinity probes may be barcoded such that the signals from each of them can be differentiated.

Immunoassays for detection of antibodies and other binding agents have been the workhorse for the biological and clinical communities for decades. Historically, researchers have been using crude extract from cells or virus of interest as the antigens [1]. For instance, the first generation HIV serological assay uses whole HIV infected cell lysates as antigens in the enzyme-linked immunosorbent assay (ELISA) [1]. However, such assays suffer from lower specificity due to presence of contaminating bystander materials (e.g. other irrelevant cellular components). Second generation assays have been developed which use recombinantly expressed and purified proteins as the antigens (e.g. gp160, gp120, gp41 and p24 proteins) [1]. Improved specificities for second generation assays have been reported [1]. Nevertheless, in many applications, recombinant antigen-based immunoassays still face major challenges in terms of assay specificity. For example, outbreaks of dengue virus (DENV) and Zika virus (ZIKV) infection highlight a need for a highly specific immunoassay [2]. In this case, even highly purified recombinant envelope (E) or non-structural protein 1 (NS1) from each virus often fail to reliably discriminate the infection [2]. Thus, to further enhance the assay specificity, it may be beneficial to further refine the resolution of the immunoassays by employing individual epitopes as the antigens. Indeed, a peptide from ZIKV non-structural protein 2B (NS2B) can better differentiate DENV and ZIKV infection than a whole recombinant antigen [3]. The immunoassay field has witnessed a trend toward more defined antigens, from crude cell extracts, to recombinant proteins, and finally to individual epitopes. Some enhancements lead to improved resolution of immunoassays and better assay performance, especially in terms of specificity.

Indeed, extensive efforts have been committed by the fields to identify disease relevant epitopes using variety of tools [4]. The most common and routine tool is protein microarrays. Company such as Roche, Thermo Fischer and Affimetrix have developed high-throughput protocol to print large number of proteins and peptides onto to solid support in fine patterns [3]. One can employ these arrays to assay and compare reactive patterns between disease and control patient samples. The difference may reveal specific epitopes pertaining to the disease states.

In addition to microarrays, phage display can be another effective approach [5]. In this case, each phage can display short peptides of interest on its surface. Given that it is relatively easy to manipulate gene profiles in the phage system, one can routinely develop a phage library composed of more than 109 distinct peptides. This order of magnitude is far beyond what one can achieve with traditional microarrays. Similarly, one can incubate the phage library with serum samples from different disease groups. Then, the sequencing of retaining phages may reveal epitope profiles for the disease state patients.

Aside from these conceptually similar approaches, additional methods may be employed such as shotgun mass spectrometry to profile epitope patterns [6]. Briefly, one uses mutagenesis techniques to introduce point mutation in the antigens of interest. Then, one may obtain a library of mutated antigens that each differ from one another at a single amino acid. After incubation of patient serum samples with such antigen library, one can then use mass spectrometry to identify the antigens that are captured, and pinpoint which point mutations would cause major changes in signals. These mutations may then reside in the disease relevant epitopes.

Finally, X-ray crystallography is generally the most definitive approach to visualize the epitope of interest. For instance, x-ray crystallography has been used to identify binding interactions between celiac antibodies and tissue transglutaminase [7]. In addition, x-ray crystallography has also revealed definitive binding profiles of the blockbuster drug Herceptin with its targets (e.g. EGFR) [8]. This evidence can unambiguously define the binding epitope of the underlying therapeutics.

Despite the wide-spectrum of possibilities, current epitope profiling approaches still face major limitations, and have continued to face such limitations for several years. For example, some of the aforementioned approaches have the ability to identify conformational epitopes, and some do not [9].

Conformational epitopes may be contrasted with linear epitopes. Conformational epitopes may include a few amino acids that are far apart from the view of peptide sequences, but are actually in close proximity geometrically due to the 3D structures of the antigens.

Conformational epitopes play a role in many scenarios, and in some embodiments their role may be critical. For instance, many receptor and ligand interactions are based on conformational epitopes. Moreover, many disease relevant antibodies only recognize conformational epitopes, such as some antibodies that recognize type 1 diabetes or celiac disease epitopes [10]. Many therapeutic monoclonal antibodies also target conformational epitopes on cell surface receptors [11].

As far as conformational epitopes are concerned, traditional peptide microarrays and phage display lack the capabilities to identify conformational epitopes. This is because both approaches use short peptides as the antigens. Since the peptides may not be in a protein environment that helps them fold properly and retain their proper structure in such approaches, the linear peptides may not resemble the actual conformations in native antigens. Thus, these approaches are limited in their use for conformational epitope profiling.

On the other hand, shotgun mass spectrometry and x-ray crystallography may be used to identify conformational epitopes due to the use of intact proteins. However, both approaches are tedious, expensive, and labor intensive. It is often costly to generate a large number of point mutated antigens for shotgun mass spectrometry. In addition, identification of crystallization conditions for x-ray crystallography often requires numerous repetitive screenings. Finally, both approaches require expensive instruments and skill sets that are not commonly available. As such, these approaches are largely restricted for research use, and may be limited in any possible clinical use.

This disclosure describes innovative and practical methods and systems for multiplex profiling of epitope patterns. In some embodiments, the systems and methods are applicable to conformational epitopes. This disclosure provides a solution where traditional immunoassay methods cannot detect conformational epitopes, whereas methods capable of detecting conformational epitopes are not readily accessible in clinical settings.

Some embodiments of the systems and methods described herein include one or more binding agents. For example, some embodiments of a binding agent include an affinity binding agent such as an affinity binding agent described herein. Some embodiments of a binding agent include a target binding agent.

The target binding agent may be part of a biological sample, e.g., whole blood, serum, plasma, urine, saliva, breast milk, nasal fluids, or cerebrospinal fluid. For example, the target binding agent may be or include a target antibody, such as an antibody from said biological sample. The biological sample may be from a patient or other subject, preferably a human but it could include an animal such as a dog, cat, horse, cow, pig, or bird. Some embodiments include multiple affinity binding agents or multiple target binding agents.

Examples of binding agents include antibodies, nanobodies, peptoids, aptamers, or fragments or functional fragments thereof. In some embodiments, a binding agent is composed of, is derived from or comprises a wild-type or non-wild-type sequence of an antibody, an antibody fragment, an scFv, a Fv, a Fab, a (Fab')2, a single domain antibody (SDAB), a vH or vL domain, a camelid VHH domain, or a non-immunoglobulin scaffold such as a DARPIN, an affibody, an affilin, an adnectin, an affitin, a repebody, a fynomer, an alphabody, an avimer, an atrimer, a centyrin, a pronectin, an anticalin, a kunitz domain, an Armadillo repeat protein, an autoantigen, a receptor or a ligand.

There are provided, in several embodiments, one or more binding agents. As used herein, the term "binding agent" shall be given its ordinary meaning, and shall also refer to a protein comprising an antigen-binding fragment that binds to an epitope or antigen and, optionally. In some embodiments, the antigen or epitope is a cancer or disease antigen or a fragment thereof. In some embodiments, the antigen-binding fragment comprises at least one CDR from an antibody that binds to the antigen. In some embodiments, the antigen-binding fragment comprises all three CDRs from the heavy chain of an antibody that binds to the antigen or from the light chain of an antibody that binds to the antigen. In still some embodiments, the antigen-binding fragment comprises all six CDRs from an antibody that binds to the antigen (three from the heavy chain and three from the light chain). In several embodiments, the antigen-binding fragment comprises one, two, three, four, five, or six CDRs from an antibody that binds to the antigen, and in several embodiments, the CDRs can be any combination of heavy and/or light chain CDRs. The antigen-binding fragment in some embodiments is an antibody fragment.

Non-limiting examples of binding agents include antibodies, antibody fragments (e.g., an antigen-binding fragment of an antibody), antibody derivatives, or antibody analogs. Further specific examples include, but are not limited to, a single-chain variable fragment (scFv), a nanobody (e.g. VH domain of camelid heavy chain antibodies; VHH fragment), a Fab fragment, a Fab' fragment, a F(ab')2 fragment, a Fv fragment, a Fd fragment, or a complementarity determining region (CDR) fragment. These molecules can be derived from any mammalian source, such as human, mouse, rat, rabbit, or pig, dog, or camelid. Antibody fragments may compete for binding of a target antigen with an intact (e.g., native) antibody and the fragments may be produced by the modification of intact antibodies (e.g. enzymatic or chemical cleavage) or synthesized de novo using recombinant DNA technologies or peptide synthesis.

In some embodiments, a binding agent comprises one or more antibody fragments incorporated into a single polypeptide chain or into multiple polypeptide chains. For instance, binding agents can include, but are not limited to, a diabody; an intrabody; a domain antibody (single VL or VH domain or two or more VH domains joined by a peptide linker); a maxibody (2 scFvs fused to Fc region); a triabody; a tetrabody; a minibody (scFv fused to CH3 domain); a peptibody (one or more peptides attached to an Fc region); a linear antibody (a pair of tandem Fd segments (VH-CH1-VH-CH1) which, together with complementary light chain polypeptides, form a pair of antigen binding regions); a small modular immunopharmaceutical; or immunoglobulin fusion proteins (e.g. IgG-scFv, IgG-Fab, 2scFv-IgG, 4scFv-IgG, VH-IgG, IgG-VH, or Fab-scFv-Fc).

In some embodiments, a binding agent has the structure of an immunoglobulin. As used herein, the term "immunoglobulin" shall be given its ordinary meaning, and shall also refer to a tetrameric molecule, with each tetramer comprising two identical pairs of polypeptide chains, each pair having one "light" (about 25 kDa) and one "heavy" chain (about 50-70 kDa). The amino-terminal portion of each chain includes a variable region of about 100 to 110 or more amino acids primarily responsible for antigen recognition. The carboxy-terminal portion of each chain defines a constant region primarily responsible for effector function.

Within light and heavy chains, the variable (V) and constant regions (C) are joined by a "J" region of about 12 or more amino acids, with the heavy chain also including a "D" region of about 10 more amino acids. The variable regions of each light/heavy chain pair form the antibody binding site such that an intact immunoglobulin has two binding sites.

Immunoglobulin chains exhibit the same general structure of relatively conserved framework regions (FR) joined by three hypervariable regions, also called complementarity determining regions or CDRs. From N-terminus to C-terminus, both light and heavy chains comprise the domains FR1, CDR1, FR2, CDR2, FR3, CDR3 and FR4.

Human light chains are classified as kappa and lambda light chains. An antibody "light chain", refers to the smaller of the two types of polypeptide chains present in antibody molecules in their naturally occurring conformations. Kappa (K) and lambda (λ) light chains refer to the two major antibody light chain isotypes. A light chain may include a polypeptide comprising, from amino terminus to carboxyl terminus, a single immunoglobulin light chain variable region (VL) and a single immunoglobulin light chain constant domain (CL).

Heavy chains are classified as mu (μ), delta (Δ), gamma (γ), alpha (α), and epsilon (ε), and define the antibody's isotype as IgM, IgD, IgG, IgA, and IgE, respectively. An antibody "heavy chain" refers to the larger of the two types of polypeptide chains present in antibody molecules in their naturally occurring conformations, and which normally determines the class to which the antibody belongs. A heavy chain may include a polypeptide comprising, from amino terminus to carboxyl terminus, a single immunoglobulin heavy chain variable region (VH), an immunoglobulin heavy chain constant domain 1 (CH1), an immunoglobulin hinge region, an immunoglobulin heavy chain constant domain 2 (CH2), an immunoglobulin heavy chain constant domain 3 (CH3), and optionally an immunoglobulin heavy chain constant domain 4 (CH4).

The IgG-class is further divided into subclasses, namely, IgG1, IgG2, IgG3, and IgG4. The IgA-class is further divided into subclasses, namely IgA1 and IgA2. The IgM has subclasses including, but not limited to, IgM1 and IgM2. The heavy chains in IgG, IgA, and IgD antibodies have three domains (CH1, CH2, and CH3), whereas the heavy chains in IgM and IgE antibodies have four domains (CH1, CH2, CH3, and CH4). The immunoglobulin heavy chain constant domains can be from any immunoglobulin isotype, including subtypes. The antibody chains are linked together via inter-polypeptide disulfide bonds between the CL domain and the CH1 domain (e.g., between the light and heavy chain) and between the hinge regions of the antibody heavy chains.

In some embodiments, a binding agent is an antibody. The term "antibody", as used herein, refers to a protein, or polypeptide sequence derived from an immunoglobulin molecule which specifically binds with an antigen. Antibodies can be monoclonal, or polyclonal, multiple or single chain, or intact immunoglobulins, and may be derived from natural sources or from recombinant sources. Antibodies can be tetramers of immunoglobulin molecules. The antibody may be "humanized", "chimeric" or non-human. An antibody may include an intact immunoglobulin of any isotype, and includes, for instance, chimeric, humanized, human, or bispecific antibodies. An intact antibody will generally comprise at least two full-length heavy chains and two full-length light chains. Antibody sequences can be derived solely from a single species, or can be "chimeric," that is, different portions of the antibody can be derived from two different species as described further below. Unless otherwise indicated, the term "antibody" also includes antibodies comprising two substantially full-length heavy chains and two substantially full-length light chains provided the antibodies retain the same or similar binding and/or function as the antibody comprised of two full length light and heavy chains. For example, antibodies having 1, 2, 3, 4, or 5 amino acid residue substitutions, insertions or deletions at the N-terminus and/or C-terminus of the heavy and/or light chains are included in the definition provided that the antibodies retain the same or similar binding and/or function as the antibodies comprising two full length heavy chains and two full length light chains. Examples of antibodies include monoclonal antibodies, polyclonal antibodies, chimeric antibodies, humanized antibodies, human antibodies, bispecific antibodies, or synthetic antibodies. There is provided, in some embodiments, monoclonal or polyclonal antibodies. As used herein, the term "polyclonal antibody" shall be given its ordinary meaning, and shall also refer to a population of antibodies that are typically widely varied in composition and binding specificity. As used herein, the term "monoclonal antibody" ("mAb") shall be given its ordinary meaning, and shall also refer to one or more of a population of antibodies having identical sequences. Monoclonal antibodies bind to the antigen at a particular epitope on the antigen.

In some embodiments, a binding agent is a fragment or antigen-binding fragment of an antibody. The term "antibody fragment" refers to at least one portion of an antibody, that retains the ability to specifically interact with (e.g., by binding, steric hindrance, stabilizing/destabilizing, spatial distribution) an epitope of an antigen. Examples of antibody fragments include, but are not limited to, Fab, Fab', F(ab')2, Fv fragments, scFv antibody fragments, disulfide-linked Fvs (sdFv), a Fd fragment consisting of the VH and CH1 domains, linear antibodies, single domain antibodies such as sdAb (either vL or vH), camelid vHH domains, multi-specific antibodies formed from antibody fragments such as a bivalent fragment comprising two Fab fragments linked by a disulfide bridge at the hinge region, or an isolated CDR or other epitope binding fragments of an antibody. An antigen binding fragment can also be incorporated into single domain antibodies, maxibodies, minibodies, nanobodies, intrabodies, diabodies, triabodies, tetrabodies, v-NAR or bis-scFv. An antibody fragment may include a Fab, Fab', F(ab')2, or Fv fragment that contains at least one CDR of an immunoglobulin that is sufficient to confer specific antigen binding to an epitope such as an epitope of a cancer or a disease antigen. Antibody fragments may be produced by recombinant DNA techniques or by enzymatic or chemical cleavage of intact antibodies.

In some embodiments, Fab fragments are provided. A Fab fragment is a monovalent fragment having the VL, VH, CL and CH1 domains; a F(ab')2 fragment is a bivalent fragment having two Fab fragments linked by a disulfide bridge at the hinge region; a Fd fragment has the VH and CH1 domains; an Fv fragment has the VL and VH domains of a single arm of an antibody; and a dAb fragment has a VH domain, a VL domain, or an antigen-binding fragment of a VH or VL domain. In some embodiments, these antibody fragments can be incorporated into single domain antibodies, single-chain antibodies, maxibodies, minibodies, intrabodies, diabodies, triabodies, tetrabodies, v-NAR or bis-scFv. In some embodiments, the antibodies comprise at least one CDR as described herein.

There is also provided for herein, in several embodiments, single-chain variable fragments. As used herein, the term "single-chain variable fragment" ("scFv") shall be given its ordinary meaning, and shall also refer to a fusion protein in which a VL and a VH region are joined via a linker (e.g., a synthetic sequence of amino acid residues) to form a continuous protein chain wherein the linker is long enough to allow the protein chain to fold back on itself and form a monovalent antigen binding site). For the sake of clarity, unless otherwise indicated as such, a "single-chain variable fragment" is not an antibody or an antibody fragment as defined herein. Diabodies are bivalent antibodies comprising two polypeptide chains, wherein each polypeptide chain comprises VH and VL domains joined by a linker that is configured to reduce or not allow for pairing between two domains on the same chain, thus allowing each domain to pair with a complementary domain on another polypeptide chain. According to several embodiments, if the two polypeptide chains of a diabody are identical, then a diabody resulting from their pairing will have two identical antigen binding sites. Polypeptide chains having different sequences can be used to make a diabody with two different antigen binding sites. Similarly, tribodies and tetrabodies are antibodies comprising three and four polypeptide chains, respectively, and forming three and four antigen binding sites, respectively, which can be the same or different.

In several embodiments, a binding agent comprises one or more CDRs. As used herein, the term "CDR" shall be given its ordinary meaning, and shall also refer to the complementarity determining region (also termed "minimal recognition units" or "hypervariable region") within antibody variable sequences. The CDRs permit the binding agent to specifically bind to a particular antigen of interest. There are three heavy chain variable region CDRs (CDRH1, CDRH2 and CDRH3) and three light chain variable region CDRs (CDRL1, CDRL2 and CDRL3). The CDRs in each of the two chains typically are aligned by the framework regions to form a structure that binds specifically to a specific epitope or domain on the target protein. From N-terminus to C-terminus, naturally-occurring light and heavy chain variable regions both typically conform to the following order of these elements: FR1, CDR1, FR2, CDR2, FR3, CDR3 and FR4. A numbering system has been devised for assigning numbers to amino acids that occupy positions in each of these domains. This numbering system can be defined in Kabat Sequences of Proteins of Immunological Interest (1987 and 1991, NIH, Bethesda, MD), or Chothia & Lesk, 1987, J. Mol. Biol. 196:901-917; Chothia et al., 1989, Nature 342:878-883. Complementarity determining regions (CDRs) and framework regions (FR) of a given antibody may be identified using this system. Other numbering systems for the amino acids in immunoglobulin chains include IMGT® (the international ImMunoGeneTics information system; Lefranc et al, Dev. Comp. Immunol. 29:185-203; 2005) and AHo (Honegger and Pluckthun, J. Mol. Biol. 309(3):657-670; 2001). One or more CDRs may be incorporated into a molecule either covalently or noncovalently to make it an binding agent.

In some embodiments, binding agents provided herein comprise one or more CDR(s) e.g., as part of a larger polypeptide chain. In some embodiments, the binding agents covalently link the one or more CDR(s) to another polypeptide chain. In some embodiments, the binding agents incorporate the one or more CDR(s) noncovalently.

Some embodiments of the systems and methods described herein include one or more multiplex affinity probes. In some embodiments, the multiplex affinity probes each include affinity binding agents and/or detectable probes. For example, a multiplex affinity probe may comprise or consist of an affinity binding agent and a detectable probe. Some embodiments include a first multiplex affinity probe comprising or consisting of a first affinity binding agent and a first detectable probe, a second multiplex affinity probe comprising or consisting of a second affinity binding agent and a second detectable probe, and/or a third multiplex affinity probe comprising or consisting of a third affinity binding agent and a third detectable probe.

In some embodiments of the methods and systems described herein, the multiplex affinity probes each include an affinity binding agent. In some embodiments, the affinity binding agent of one multiplex affinity probe is separate or distinct from the affinity binding agent of one or multiple other multiplex affinity probes. The multiplex affinity probes or affinity binding agents of some embodiments may include any binding agents described herein.

In some embodiments of the methods and systems described herein, the affinity binding agent is part of a multiplex affinity probe. Some embodiments include multiple affinity probes with separate or distinct affinity binding agents. Some embodiments of the affinity binding agents include or consist of any binding agent as described herein. For example, in some embodiments of an assay system or assay method as described herein, the first and second binding agents each comprise an antibody, nanobody, peptoid, or aptamer.

In some embodiments, the multiplex affinity probe or affinity binding agent includes a recombinant protein. The recombinant protein of the multiplex affinity probe or affinity binding agent may be or include an antibody or other binding agent. In some embodiments, the recombinant protein of the multiplex affinity probe or affinity binding agent is encoded by a nucleic acid such as an RNA or a DNA. The encoding nucleic acid may be provided to a cell and produced by the cell, after which the recombinant protein may be harvested or isolated from the cell. The cell may be a eukaryotic cell such as a human or yeast cell, or a prokaryotic cell such as a bacterial cell.

In some embodiments of the methods and systems described herein, the multiplex affinity probes each include a detectable probe such as a detectable probe described herein. In some embodiments, the detectable probe of one multiplex affinity probe is separate or distinct from the detectable probe of one or multiple other multiplex affinity probes.

Figure 2:
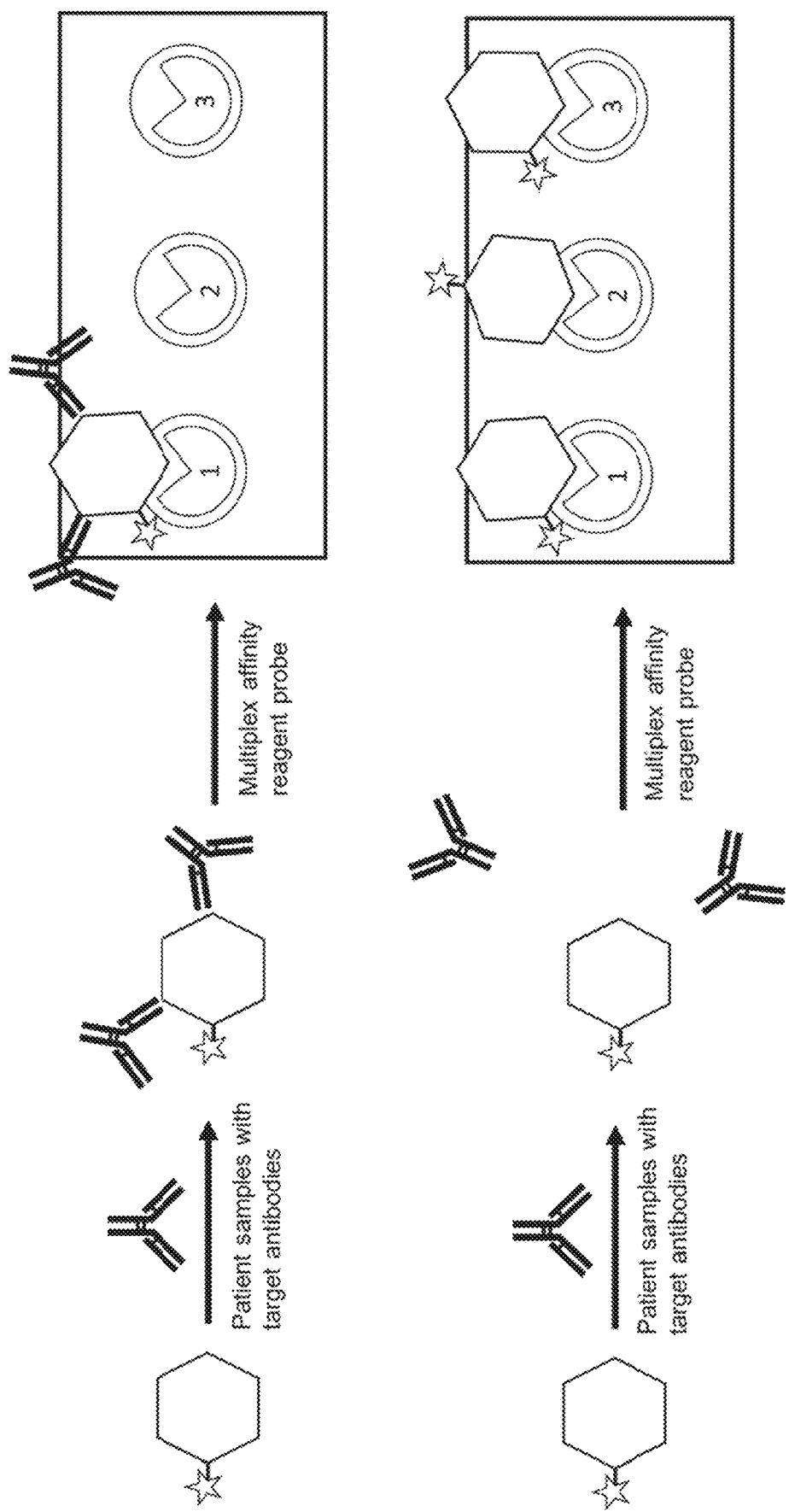
FIG. 2 is a diagram showing some embodiments that include solid supports that may be spatially encoded.

As shown in FIG. 2. one can anchor the affinity binding agents onto different locations of a solid support. As such, by assaying the signal intensities on different spots on the solid support, one can infer whether a competition event has occurred. In such a case, the barcode is "spatially encoded".

In some embodiments of the methods and systems described herein, one can deposit the affinity binding agents or multiplex affinity probes onto distinct positions on a solid support (see FIG. 2). In some embodiments, the "barcode" on the affinity agent is its physical location (e.g. spatially barcoded). In some embodiments, the an antigen probe comprising epitopes is labeled with a detectable probe and incubated with a biological sample from a patient (also referred to here as a patient sample), following which the whole mixture contacted or incubated with a solid support on which affinity agents are deposited. In some such embodiments, if there are target binding agents such as target antibodies in the patient sample, the labeled antigen probes are unable to engage with affinity agents on the solid support since the epitopes of the antigen probes are already occupied by target binding agents of the patient sample. One can analyze signals from the detectable probes at different locations on the solid support to reveal epitope binding patterns and determine whether the patient sample comprised target binding agents.

In some embodiments of the methods and systems described herein, the first and second multiplex affinity probes are each bound or conjugated to a solid support. In some embodiments, the first and second multiplex affinity probes are each bound or conjugated separate predetermined locations on the solid support. In some embodiments, the solid support comprises a plate, a bead, a membrane, a polymer, a matrix, metal, plastic, ceramic, or glass or any combination thereof.

Some embodiments of the systems and methods described herein include one or more an antigen probes. In some embodiments, the antigen probe comprises or consists of a recombinant protein. In some embodiments, the antigen probe or recombinant protein includes at least one epitope. The recombinant protein or antigen probe may comprise or consist of a first epitope, a second epitope, a third epitope, a fourth epitope, a fifth epitope, or more epitopes. In some embodiments, each epitope is recognizable by one or more binding agents such as target binding agents or affinity binding agents of multiplex affinity probes or both.

In some embodiments of the systems and methods described herein, each epitope is recognizable by separate or distinct binding agents. For example, a first binding agent (such as an affinity binding agent of a first multiplex affinity probe, or a first target antibody) may recognize and/or bind to a first epitope of an antigen probe, a second binding agent (such as an affinity binding agent of a second multiplex affinity probe, or a second target antibody) may recognize and/or bind to a second epitope of the antigen probe, and/or a third binding agent (such as an affinity binding agent of a third multiplex affinity probe, or a third target antibody) may recognize and/or bind to a third epitope of the antigen probe. The recognition of any binding agent for an epitope of an antigen probe may be specific.

In some embodiments of the systems and methods described herein, the antigen probe comprises or consists of a first epitope and a second epitope. In some embodiments, the antigen probe comprises or consists of a recombinant protein comprising the first and second epitopes. In some cases, the recombinant protein may be any protein of interest for which binding agents have or may be developed. Some examples of proteins of interest include a Flavivirus NS1 protein, a Thyrotropin receptor, a G-protein-coupled receptor (GPCR), a T-cell receptor, insulin, a muscle nicotinic acetylcholine receptor, an NMDA receptor, an AMPA receptor, or a GABA-B receptor. In some embodiments, the recombinant protein is or includes a fragment of a protein. In some embodiments, the recombinant protein is a full-length protein.

In some embodiments, the recombinant protein is encoded by a nucleic acid such as an RNA or a DNA. The nucleic acid may be provided to a cell and produced by the cell, after which the recombinant protein may be harvested or isolated from the cell. The cell may be a eukaryotic cell such as a human or yeast cell, or a prokaryotic cell such as a bacterial cell.

In some embodiments of the systems and methods described herein, an epitope of the antigen probe is a linear epitope. In some embodiments, an epitope of the antigen probe is a conformational epitope. In some embodiments, the first and second epitopes each comprise a linear or conformational epitope.

In some embodiments of the systems and methods described herein, the antigen probe is bound or conjugated to a solid support or substrate. In some embodiments, the solid support comprises a plate, a bead, a membrane, a polymer, a matrix, metal, plastic, ceramic, or glass or any combination thereof.

One skilled in the art can naturally extend the concept of multiplex competition assays to more than a single antigen. For instance, one can use a set of affinity binding agents against multiple antigens to develop multiplex competition assays against multiple epitopes on multiple antigens.

An innovation in accordance with some embodiments is to use a set of affinity binding agents to define the conformational epitopes, rather than, for example, using individual peptides. In some embodiments, this feature allows one to investigate not just linear but also conformational epitopes.

Some embodiments of the systems and methods described herein include one or more detectable probes. In some embodiments, one or more multiplex affinity probes and/or antigen probes include detectable probes. In some embodiments, a multiplex affinity probe and/or an antigen probe does not have or does not include a detectable probe. Some embodiments include a first, second, and/or third multiplex affinity probe, each with a detectable probe. In some embodiments, the first, second, and/or third multiplex affinity probes each include different or distinct detectable probes. Some embodiments include an antigen probe with a detectable probe. In some embodiments, a multiplex affinity probe or an antigen probe includes more than one detectable probe.

Examples of detectable probes include peptides tags, fluorescent or magnetic labels, beads, or barcodes such as DNA barcodes. Examples of fluorescent labels include YFP, GFP, CFP, or other fluorescent proteins. Examples of peptide tags include hexahistidine tags, maltose-binding protein tags, GST tags, FLAG tags, or Strep-tags. In some embodiments, the detectable probe includes any peptide or agent recognizable by a binding agent.

In some embodiments of the systems and methods described herein, an antigen probe includes a recombinant protein bound to the detectable probe. For example, the antigen probe may include a fusion protein that includes the detectable probe. In some embodiments, the recombinant protein is bound through a linker such as a linker peptide to the detectable probe.

In some embodiments of the systems and methods described herein, a multiplex affinity probe includes an affinity binding agent bound to the detectable probe. For example, the antigen probe may include a fusion protein that includes the detectable probe. In some embodiments, the recombinant protein is bound through a linker such as a linker peptide to the detectable probe.

One can implement the multiplex competition assay in several ways. In some embodiments of the systems and methods described herein, the first, second, and third detectable probes each comprise a bead, or a fluorescent peptide. One can couple the affinity agents onto a set of barcoded beads (e.g. color coded, pattern coded), or fluorescently label an antigen of interest (see FIG. 3) or both. In some such embodiments, a biological sample (also referred to here as a patient sample, e.g., whole blood, serum, plasma, urine, saliva, breast milk, nasal fluids, or cerebrospinal fluid) is incubated with an antigen probe, followed by the addition of multiplex affinity probes comprising affinity binding agent-coupled beads. In some embodiments, if there are target antibodies in the patient sample, the fluorescent labeled antigen is unable to engage with the affinity binding agents on the beads, and there is a loss or lack of fluorescent signals on the bead. Then, one can profile the fluorescent intensities on the bead surface using, for example, standard cytometry or similar instruments. In some embodiments, the beads with a lack of or loss of signal indicates the presence of antibodies against that epitope.

Figure 3:
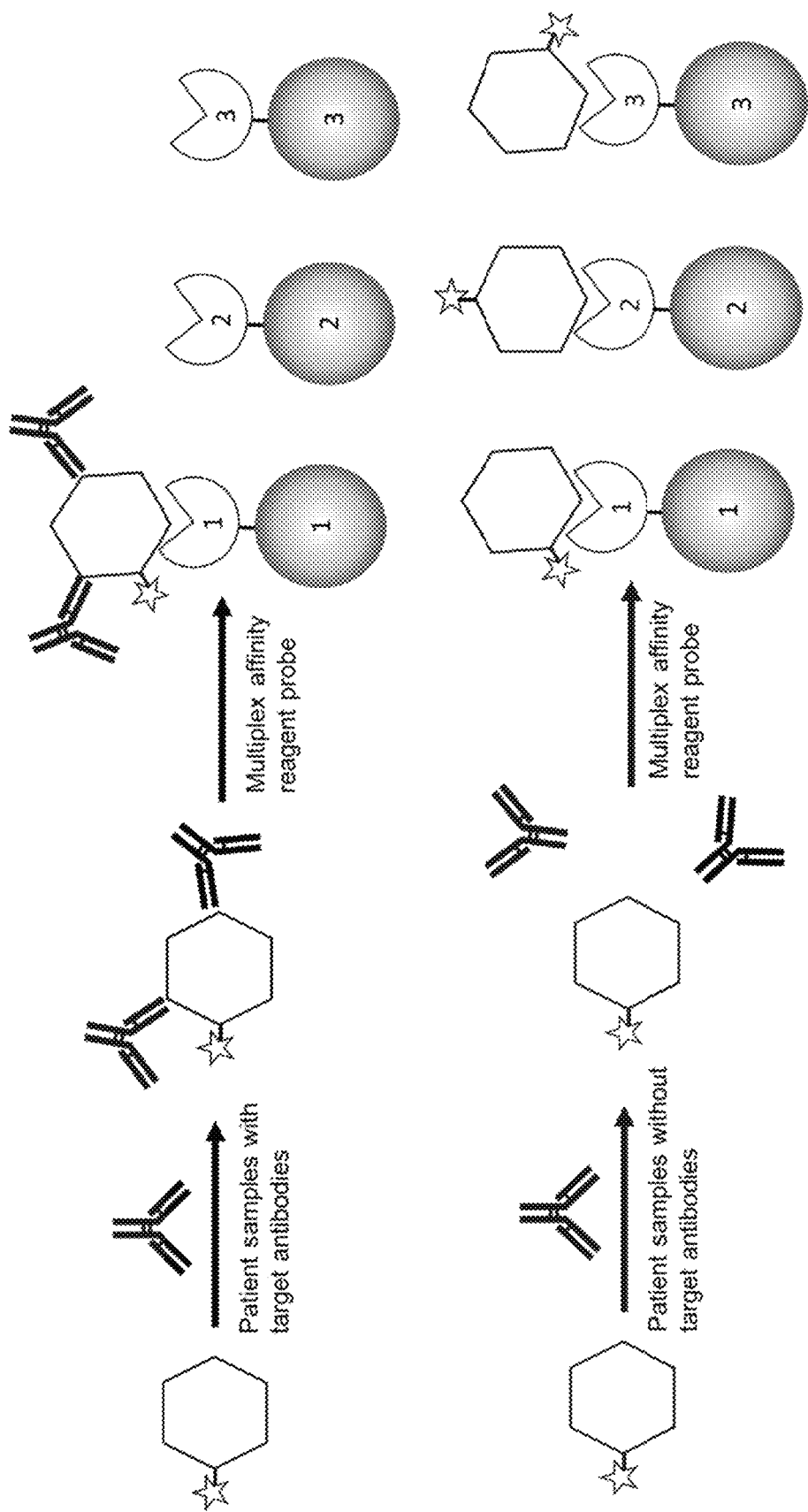
FIG. 3 is a diagram showing some embodiments that include beads.

FIG. 3 illustrates an example implementation using bead-based barcodes. In the example shown in FIG. 3, each of the multiplex affinity reagents are tagged by barcoded beads (e.g. fluorescent barcoded, digital barcoded). Then, in the event of patient samples containing antibodies capable of competing off antibody-antigen binding, one will observe a loss of signals from that specific beads. Since each affinity binding agent is barcoded by a different bead, one can then discriminate the competition reaction in a multiplex manner.

Figure 4:
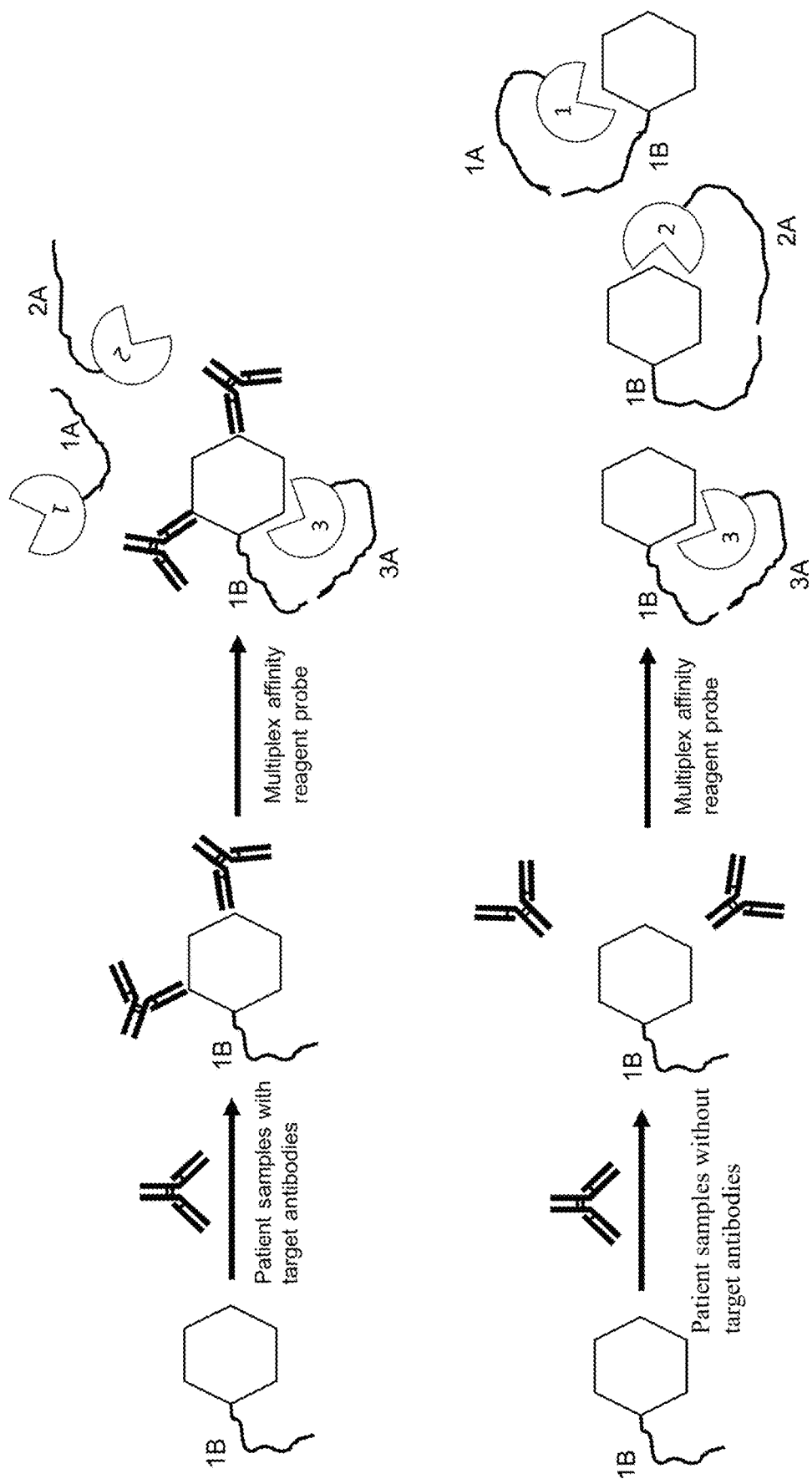
FIG. 4 is a diagram showing some embodiments that include detectable probes comprising nucleic acids.
Figure 5:
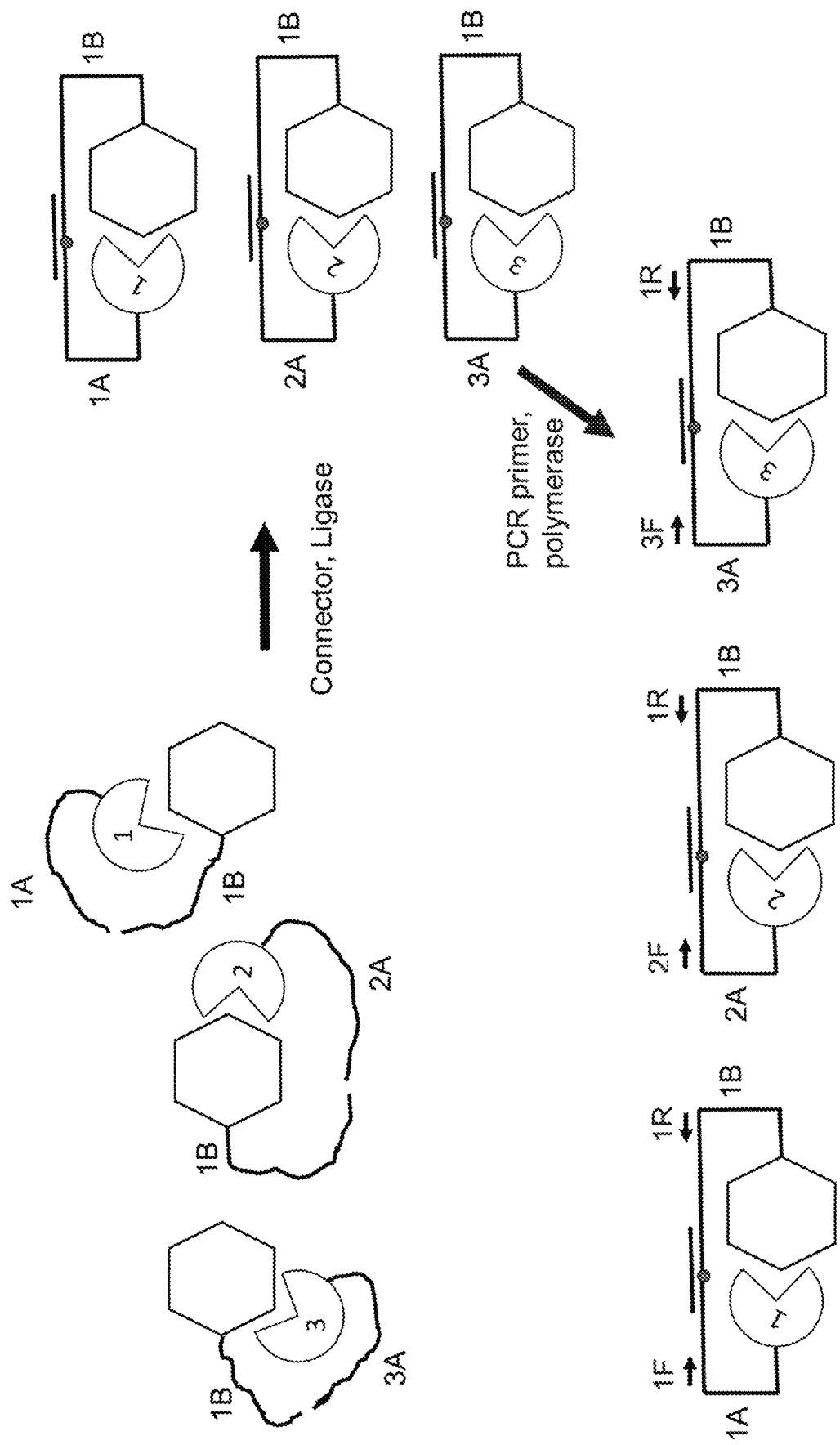
FIG. 5 is a diagram showing some embodiments that include detectable probes comprising nucleic acids and a connector nucleic acid.

In some implementations, one can use a DNA-barcode approach to perform a multiplex competition assay (see FIG. 4). In some such embodiments, a DNA barcode is conjugated onto an antigen of interest to form an antigen probe comprising the DNA barcode and antigen of interest, and other DNA barcodes are conjugated onto affinity binding agents to form multiplex affinity probes comprising the other DNA barcodes and the affinity binding agents. Different DNA barcodes can be instilled on different affinity agents. In some embodiments, patient samples are incubated with the DNA-barcoded antigen probe, following which the DNA-barcoded affinity binding agents are added. In some embodiments, if there are no target antibodies present or if target antibodies do not bind to the antigen probe, the affinity agent binds onto the antigen probe, thereby positioning the two DNA barcodes in close proximity. One can then use a connector such as a connector nucleic acid and ligase to link the two barcodes together (FIG. 5). Then, one can use primers in an amplification reaction such as polymerase chain reaction (PCR) to amplify and quantify the signals. On the other hand, if target antibodies are present, they may occupy the binding sites on the antigen probe and prevent barcoded affinity agents from engaging or binding the antigen probe. Thus, the affinity binding agent may be unable to bind the antigen probe. In some embodiments, this prevents the two DNA barcodes from coming close to one another, and after addition of the connector and ligase the two DNA barcode are not joined together. Thus, little or no PCR signals are detected in some embodiments when target binding agents are present in the patient sample. In some embodiments when different affinity binding agents have different barcodes on them, different primer pairs may be used in PCR reactions to discriminate them, thus achieving multiplex quantification. Additionally, apart from using the ligation-based method to reunite the DNA together, one can also use a method such as an enzyme-extension method to achieve the results of the method [see 15], herein expressly incorporated by reference in its entirety.

FIG. 4 shows an example of an implementation of the multiplex competition assay that comprises a ligation-based PCR assay. In the example, the antigen probe has one barcode or one half of a full length DNA barcode, and the affinity binding reagents have another barcode or another half of the DNA barcode. Without a competition event where target antibodies are not present in the patient sample or are not at sufficient levels to engage the antigen probes, the affinity binding agents and the antigen probes bind each other, thereby bringing each of their barcodes in close proximity. Thus, one can use DNA barcodes to deconvolute the multiplex binding events. On the other hand, in the case of a competition event where target antibodies are present in the patient sample or are at sufficient levels to engage the antigen probes, the affinity binding agents are unable to bind onto the antigen probes. Thus, the two DNA barcodes may be unable to be brought into close proximity. As shown in FIG. 5, the proximity of the two DNA barcodes may then be used to determine whether a PCR-amplifiable signal can be generated and detected.

In the example shown in FIG. 5, two DNA barcodes in close proximity can be ligated together through addition of a connector (such as a connector nucleic acid that hybridizes onto a portion of each DNA barcode) and a DNA ligase. Once ligated together, one can use a pair of primers to amplify and quantify the signals. In some embodiments, the barcode on each affinity binding agent shares a sequence that is the same or matches a sequence on the barcode of the antigen probe, but a sequence that is different and/or does not match the sequence of the barcode of another affinity binding agent.

In some embodiments of the systems and methods described herein, a first multiplex affinity probe is provided comprising a first detectable probe, a second multiplex affinity probe is provided comprising a second detectable probe, and an antigen probe is provided comprising third detectable probe. In some embodiments, the first, second, and/or third detectable probes each comprise a nucleic acid such as a DNA barcode. It is also contemplated that the nucleic acid of each detectable probe may comprise an RNA or a modified nucleotide. In some embodiments, the barcodes of the first and third detectable probes are complementary or each comprise a complementary region with each other. In some embodiments, the barcodes of the second and third detectable probes are complementary or each comprise a complementary region with each other. In some embodiments, the barcodes of the first and third detectable probes are complementary or each comprise a region complementary to a first connector nucleic acid. In some embodiments, the barcodes of the second and third detectable probes are complementary or each comprise a region complementary to the first connector nucleic acid, or to a second connector nucleic acid. Some embodiments do not include a connector nucleic acid.

In some embodiments of the systems and methods described herein, the barcodes of the first and third detectable probes are complementary or each comprise a region complementary to a first primer. In some embodiments, the barcodes of the second and third detectable probes are complementary or each comprise a region complementary to the first primer, or to a second primer. The primers may be used to amplify a region of any of the barcodes. Examples of such primers include nucleic acid primers such as DNA primers. In some embodiments, the primers are used for PCR such as quantitative PCR (qPCR) amplify a region of any of the barcodes, and/or to quantitate or determine the presence of the amplified region.

Some embodiments include a system such as an assay system. In some embodiments, the assay system includes a first multiplex affinity probe such as a multiplex affinity probe described herein. In some embodiments, the first multiplex affinity probe includes a first affinity binding agent and/or a first detectable probe. In some embodiments, the assay system includes a second multiplex affinity probe such as a multiplex affinity probe described herein. In some embodiments, the second multiplex affinity probe includes a second affinity binding agent and/or a second detectable probe. In some embodiments, the assay system includes a third multiplex affinity probe such as a multiplex affinity probe described herein. In some embodiments, the third multiplex affinity probe includes a third affinity binding agent and/or another detectable probe. In some embodiments, the assay system includes an antigen probe such as an antigen probe described herein. In some embodiments, the antigen probe includes a first epitope. In some embodiments, the first epitope of the antigen probe is recognizable by the first affinity binding agent. In some embodiments, the antigen probe includes a second epitope. In some embodiments, the second epitope of the antigen probe is recognizable by the second affinity binding agent. In some embodiments, the antigen probe includes a third epitope. In some embodiments, the third epitope of the antigen probe is recognizable by the third affinity binding agent. In some embodiments, the antigen probe includes a third detectable probe. In some embodiments, any of the multiplex affinity probes or antigen probes include multiple detectable probes.

In some embodiments, the assay system includes: a first multiplex affinity probe comprising a first affinity binding agent and a first detectable probe; a second multiplex affinity probe comprising a second affinity binding agent and a second detectable probe; and an antigen probe comprising a first epitope recognizable by the first affinity binding agent, a second epitope recognizable by the second affinity binding agent, and a third detectable probe.

In some embodiments of the assay system, the first, second, third, and/or other detectable probe includes a barcode such as a nucleic acid barcode or DNA barcode. In some embodiments, the assay system includes one or more connector nucleic acids hybridizable to any of the barcodes of the first, second, third, and/or other detectable probes. In some embodiments, the assay system includes a first connector nucleic acid hybridizable to the DNA barcodes of the first and third detectable probes. In some embodiments, the first connector nucleic acid is also hybridizable to the DNA barcode of the second detectable probe. In some embodiments, the assay system includes a second connector nucleic acid hybridizable to the DNA barcodes of the second and third detectable probes.

In some embodiments, one or more of the barcodes include a modified nucleotide. Examples of nucleotide modifications include phosphorylation or thiolation. In some embodiments, a carbon at position 3 of a ribose or deoxyribose of a nucleotide is modified. In some embodiments, a carbon at position 5 of a ribose or deoxyribose of a nucleotide is modified. In some embodiments, the 3' end of the barcode is modified. In some embodiments, the 5' end of the barcode is modified.

In some embodiments, the assay system includes a ligase. For example, the ligase may be used to ligate any of the barcodes of any of the detectable probes, such as the first and third detectable probes or the second and third detectable probes.

In some embodiments, the assay system includes a polymerase or reverse transcriptase. Examples of polymerases include DNA and RNA polymerases. In some embodiments, the assay system includes a DNA polymerase e.g., an isothermal polymerase. The polymerase or reverse transcriptase may be used to elongate the any of the detectable probes and/or any connector nucleic acid hybridized thereto. The polymerase may also be used to elongate and/or amplify a region of any of the detectable probes and/or connector nucleic acids. In some embodiments, the DNA polymerase comprises 3' exonuclease activity.

In some embodiments, the assay system includes an amplification primer specific for the DNA barcode of the first detectable probe. In some embodiments, the assay system includes an amplification primer specific for the DNA barcode of the second detectable probe. In some embodiments, the assay system includes an amplification primer specific for the DNA barcode of the third detectable probe. In some embodiments, the assay system includes a reagent for conducting a ligation reaction, and/or a reagent for conducting a nucleic amplification reaction such as PCR or isothermal amplification.

Some embodiments include a kit that comprises any aspect of the systems described above. For example, some embodiments relate to a kit that includes one or more multiplex affinity probes, and/or an antigen probe. In some embodiments, the kit includes written instructions for use of a system as described herein.

Some embodiments include a method such as an assay method. In some embodiments, the assay method includes a system as described herein. In some embodiments, the assay method includes providing a first multiplex affinity probe. The first multiplex affinity probe may include a first affinity binding agent and/or a first detectable probe. In some embodiments, the assay method includes providing a second multiplex affinity probe. The second multiplex affinity probe may include a second affinity binding agent and/or a second detectable probe. In some embodiments, the assay method includes providing a third multiplex affinity probe. The third multiplex affinity probe may include a third affinity binding agent and/or another detectable probe. In some embodiments, the assay method includes providing an antigen probe. The antigen probe may include a first epitope recognizable by the first affinity binding agent. The antigen probe may include a second epitope recognizable by the second affinity binding agent. The antigen probe may include a third epitope recognizable by the third affinity binding agent. The antigen probe may include a third detectable probe.

In some embodiments, the assay method includes: providing a first multiplex affinity probe comprising a first affinity binding agent and a first detectable probe; providing a second multiplex affinity probe comprising a second affinity binding agent and a second detectable probe; and providing an antigen probe comprising a first epitope recognizable by the first affinity binding agent, a second epitope recognizable by the second affinity binding agent, and a third detectable probe. Some embodiments of the assay method include: providing a biological sample suspected of comprising a first target antibody specific for the first epitope or a second target antibody specific for the second epitope; contacting the biological sample with the antigen probe, wherein the first target antibody binds to the first epitope to form a first target antibody epitope complex if the biological sample comprises the first target antibody, and wherein the second target antibody binds to the second epitope to form a second target antibody epitope complex if the biological sample comprises the second target antibody; contacting the biological sample with the first and second multiplex affinity probes, wherein the first multiplex affinity probe binds to the first epitope to form a first multiplex affinity probe epitope complex if the biological sample does not comprise the first target antibody, and wherein the second multiplex affinity probe binds to the second epitope to form a second multiplex affinity probe epitope complex if the biological sample does not comprise the second target antibody; and detecting the presence or absence of the first and second multiplex affinity probe epitope complexes.

In some embodiments, the assay method includes providing a biological sample suspected of comprising a first target antibody (or other target binding agent) specific for the first epitope, a second target antibody (or other target binding agent) specific for the second epitope, and/or a third target antibody (or other target binding agent) specific for the third epitope.

In some embodiments, the assay method includes incubating or contacting the biological sample with the antigen probe. In some such embodiments, the first target antibody binds to the first epitope to form a first target antibody epitope complex if the biological sample comprises the first target antibody. In some embodiments, the second target antibody binds to the second epitope to form a second target antibody epitope complex if the biological sample comprises the second target antibody. In some embodiments, the third target antibody binds to the third epitope to form a third target antibody epitope complex if the biological sample comprises the third target antibody. In some embodiments, the biological sample comprises or includes the first target antibody specific for the first epitope, the second target antibody specific for the second epitope, and/or the third target antibody specific for the third epitope, and so they bind to form a first, second, and/or third target antibody epitope complex (or other target binding agent epitope complex). Some embodiments then include a wash and/or removal step, such as when the antigen probe is affixed to a solid support.

In some embodiments, the assay method includes incubating or contacting the resultant product or the biological sample with the first, second, and/or third multiplex affinity probes. In some embodiments, the first multiplex affinity probe binds to the first epitope to form a first multiplex affinity probe epitope complex if the biological sample does not comprise the first target antibody. In some embodiments, the second multiplex affinity probe binds to the second epitope to form a second multiplex affinity probe epitope complex if the biological sample does not comprise the second target antibody. In some embodiments, the third multiplex affinity probe binds to the third epitope to form a third multiplex affinity probe epitope complex if the biological sample does not comprise the third target antibody.

In some embodiments of the assay method, there is a specific number of first, second, and/or third target antibodies, and multiple first, second, and/or third antigen probes, and a specific number of first, second, and/or third target antibody epitope complexes are formed. Similarly, there may subsequently be formed a specific number of first, second, and/or third multiplex affinity probe epitope complexes based on the number of formed first, second, and/or third target antibody epitope complexes. Thus, the assay may be quantitative and/or qualitative in determining the number or presence of first, second, and/or third target antibodies (or other target binding agents) in the biological sample. The assay may also be used to compare the relative amount of first, second, and/or third target antibodies in the biological sample compared to a control sample or compared to a second biological sample.

Some embodiments of the assay method include removing any unbound target antibodies or multiplex affinity probes prior to detecting the presence or absence of the first and second multiplex affinity probe epitope complexes. For example, there may be one or more wash steps before or after any step of the method.

Some embodiments of the assay method include detecting the presence or absence of the first, second, and/or third multiplex affinity probe epitope complexes. In some embodiments, detecting the presence or absence of the first and second multiplex affinity probe epitope complexes includes detecting the presence or absence of the first and second detectable probes. In some embodiments, detecting the presence or absence of the first and second multiplex affinity probe epitope complexes comprises performing flow cytometry, electrophoresis, imaging, or sequencing or any combination thereof. For example, any of these methods, or any other method may be used to determine the presence or absence of any one or more detectable probes on a multiplex affinity probes or antigen probe.

In some embodiments of the assay method, the biological sample comprises the first target antibody and/or the second target antibody. In some embodiments, the first target antibody binds to the first epitope to form a first target antibody epitope complex. In some embodiments, the second target antibody binds to the second epitope to form a second target antibody epitope complex. In some embodiments, the first multiplex affinity probe binds to the first epitope to form a first multiplex affinity probe epitope complex. In some embodiments, the second multiplex affinity probe binds to the second epitope to form a second multiplex affinity probe epitope complex. In some embodiments, detecting the presence or absence of the first and second multiplex affinity probe epitope complexes includes detecting the presence of the first and/or second multiplex affinity probe epitope complexes.

In some embodiments of the assay method, the first, second, and third detectable probes each include a nucleic acid or DNA barcode. Some embodiments of the methods and systems provided herein include the use of one or more connector nucleic acids such as a DNA connector. In some embodiments, the connector nucleic acid includes sequences complementary to at least a portion of nucleic acid barcodes of the first, second, and/or third detectable probes. Some embodiments include hybridizing DNA barcodes of the first and third detectable probes with a first connector nucleic acid, wherein the first connector nucleic acid comprises sequences complementary to at least a portion of the DNA barcodes of the first and third detectable probes.

Some embodiments of the assay method include ligating the DNA barcodes of the first and third detectable probes together to form a first ligation product. Some embodiments include amplifying a region of the first ligation product using amplification primers specific for the DNA barcodes of the first and third detectable probes, to produce a first amplification product. Some embodiments include detecting and/or quantifying the first amplification product. Said detecting and/or quantifying the first amplification product may embody detecting the presence or absence of the first, second, and/or third multiplex affinity probe epitope complexes.

Some embodiments of the assay method include hybridizing the DNA barcodes of the second and third detectable probes with a second connector nucleic acid, wherein the second connector nucleic acid comprises sequences complementary to at least a portion of the DNA barcodes of the second and third detectable probes. Some embodiments include hybridizing the DNA barcodes of the second and third detectable probes with the first connector nucleic acid, wherein the first connector nucleic acid further comprises a sequence complementary to at least a portion of the DNA barcode of the second detectable probe. Some embodiments include ligating the DNA barcodes of the second and third detectable probes together to form a second ligation product. Some embodiments include amplifying a region of the second ligation product using amplification primers specific for the DNA barcodes of the second and third detectable probes, to produce a second amplification product. Some embodiments include detecting or quantifying the second amplification product. Said detecting or quantifying the second amplification product may embody detecting the presence or absence of the first, second, and/or third multiplex affinity probe epitope complexes.

In some embodiments of the assay method, detecting and/or quantifying the first and/or second amplification products includes conducting qPCR. For example, the qPCR may include the use of a fluorescent probe that detects the presence of amplification products.

Some embodiments of the assay method include hybridizing the DNA barcodes of the first and third detectable probes with each other. In some embodiments, the DNA barcodes of the first and third detectable probes are complementary or each comprise a complementary region with each other. Some embodiments include hybridizing the DNA barcodes of the second and third detectable probes with each other. In some embodiments, the DNA barcodes of the second and third detectable probes are complementary or each comprise a complementary region with each other.

Some embodiments do not include the use of a connector nucleic acid. Some embodiments include the use of a proximity extension assay [15]. Some embodiments include contacting the DNA barcodes of the first and third detectable probes with a DNA polymerase. In some embodiments, the DNA polymerase forms a first double-stranded DNA molecule from the first and third detectable probes. Some embodiments include contacting the DNA barcodes of the second and third detectable probes with a DNA polymerase. In some embodiments, the DNA polymerase forms a second double-stranded DNA molecule from the second and third detectable probes. In some embodiments, the DNA polymerase has 3' exonuclease activity. In some embodiments, the DNA polymerase is or includes a T4 DNA polymerase. Some embodiments include amplifying the first double stranded DNA molecule to produce a first amplification product. Some embodiments include amplifying the second double stranded DNA molecule to produce a second amplification product. Some embodiments include detecting or quantifying the first amplification product. Some embodiments include, Some embodiments include detecting or quantifying the second amplification product. In some embodiments, detecting and/or quantifying the first and/or second amplification products includes conducting qPCR.

Some embodiments relate to a method of treatment or inhibition of a disease, such as a viral infection. Some embodiments of the methods described herein include administering a pharmaceutical composition to a patient or subject if the patient sample is determined by one or more of the assay methods described herein to comprise target binding agents such as target antibodies. Some embodiments include declining to administer a therapy or treatment protocol or pharmaceutical composition to a patient based on whether the patient sample is determined by the assay method to comprise target antibodies or not. In some embodiments, such decisions are made based on the presence or absence of multiple target binding agents each recognizing different epitopes of an antigen probe.

In some embodiments, the disease is a Zika virus infection and the therapy or protocol involves a conventional Zika virus therapy. In some embodiments, the disease is a dengue virus infection and the therapy or protocol involves a conventional dengue virus therapy. In some embodiments, the therapy provided depends on the outcome of one or more of the assays described herein. Some examples of such therapies include administering a vaccination or an antiviral to a subject whose biological sample, e.g., whole blood, serum, plasma, urine, saliva, breast milk, nasal fluids, or cerebrospinal fluid, is determined to comprise a target binding agent, or administering a drug such as acetaminophen or a non-steroidal anti-inflammatory drug to individuals having positive determinations in the one or more assays described herein. In some embodiments, patients that are identified as having target antibodies or target binding agents in a tested biological sample, e.g., whole blood, serum, plasma, urine, saliva, breast milk, nasal fluids, or cerebrospinal fluid, receive isolation, and additional clinical care e.g., virus removal utilizing the Hemopurifier® obtainable through Aethlon Medical Inc.

The systems and methods described herein may be used for a variety of applications. For example, the assay is useful for detecting antibodies in a subject to determine whether the subject has a disease, and for identifying which type of a disease the subject may have. This determination may be used to guide a physician or medical professional in administering or prescribing a particular therapy or isolation protocol.

In some embodiments of the systems and methods described herein, the presence of the first or second target antibodies in the biological sample are indicative of the presence of a disease. In some embodiments, the disease comprises an infection. In some embodiments, the disease comprises a bacterial infection, fungal infection, or yeast infection. In some embodiments, the disease comprises a viral infection such as a dengue virus or Zika virus infection. In some embodiments, the disease comprises a syndrome not comprising an infection. In some embodiments, the disease comprises cancer, a hematological disease, diabetes, or an autoimmune disease.

In some embodiments of the systems and methods described herein, the biological sample is from a subject. In some embodiments, the subject is a human. In some embodiments, the subject is not a human. In some embodiments, the subject is a mammal. In some embodiments, the subject is an animal. In some embodiments, the biological sample is from a subject such as a mammal or human.

In some embodiments, the biological sample includes a liquid. In some embodiments, the biological sample comprises whole blood, serum, plasma, urine, saliva, breast milk, nasal fluids, or cerebrospinal fluid. In some embodiments, the biological sample includes cells or isolated cells. In some embodiments, the biological sample includes cell secretions or conditioned media.

The multiplex competition assay for conformational epitope profiling empowers many applications that are challenging or otherwise might not have been feasible. For instance, in a Zika outbreak, it is useful to have an assay that is capable of discriminating the Zika virus (ZIKV) and dengue virus (DENV) infections with high specificity [2]. Given the high sequence homology of ZIKV and DENV, it is well known that individual recombinant antigens alone cannot reliably differentiate the two infection. Thus, one may need to further refine the specificity at an epitope level. Computational studies have identified individual epitopes that may be specific for each virus [13]. As such, it is desirable to have a multiplex assay that can detect antibodies against individual epitopes. However, since some of the epitope might be conformational, it is desirable not to use individual peptides as the epitopes.

In some embodiments of the systems and methods described herein, one can first raise several antibodies against ZIKV in animals through immunization. Alternatively, one can clone antibodies from peripheral blood mononuclear cells (PBMC) from ZIKV infected patients. These antibodies can then serve as affinity binding agents. Given that these antibodies are derived from animals or actual patients, they are disease relevant and can bind onto both linear and conformational epitopes. In addition, one can first validate these antibodies in traditional DENV immunoassays. One can exclude antibodies that generate substantial signals in DENV assay. Thus, the resulting set of antibodies are more likely to bind onto ZIKV specific epitopes. Then, for example, one can also use Octet binning assay (sold by ForteBio) to exclude the antibodies that bind onto similar epitopes [14]. After such selection processes, one has a handful of affinity binding agents that are non-redundant and ZIKV specifics. One can use these affinity agents to construct a panel of multiplex competition assays. Given that the assay detects antibodies against ZIKV specific epitopes, this assay has higher specificity than other ZIKV assays such as some that employ individual proteins as antigens. Since, in some embodiments, this assay reveals binding profiles against multiple ZIKV specific epitopes, even if the DENV cross-react with some of the epitopes, the overall profile may still be leveraged to discriminate it from a true ZIKV infection.

In some embodiments of the systems and methods described herein, an assay described herein is used to identify or distinguish autoantibodies from drug induced antibodies. For instance, among type 1 diabetes (T1D) patients, some of them (~50%) harbor naturally occurring anti-insulin autoantibodies. Given that the standard treatment for T1D is life-long insulin injection. Most of the patients will then develop anti-insulin drug antibodies [10]. However, currently, there is no assay capable of differentiating the two kinds of antibodies against insulin (e.g. drug-induced vs natural). There is only sporadic literature reporting that naturally occurring anti-insulin autoantibodies bind onto conformational epitope whereas anti-insulin drug antibodies bind onto linear epitopes [10]. As such, one can build a multiplex competition assay for profiling epitope patterns and use the pattern to discriminate such antibodies. The assay empowers researchers to profile epidemiology of naturally occurring anti-insulin autoantibodies even in insulin treated patients. In addition, the anti-insulin autoantibodies titer may reveal information about disease progression that is not otherwise accessible, leading to particular disease treatments that would otherwise not be made. In some cases, only an assay such as one described herein that can detect insulin autoantibodies in a high background of anti-drug anti-insulin antibodies can achieve this.

In some embodiments of the systems and methods described herein, an assay described herein is used to identify or distinguish anti-drug antibodies. Therapies such as anti-TNF monoclonal antibodies (e.g. infliximab) for autoimmune disorders often elicit anti-drug antibodies in the patients [12]. For some patients, the anti-drug antibodies can neutralize the drug function and warrant the patients to receive an alternative therapy. In other patients, the anti-drug antibodies have only a minimal impact on drug responses, and serve of a bystander role. In some embodiments, the assay described herein detects anti-drug antibodies that are directed against one or more specific epitopes that are relevant to drug functions. In some embodiments, a multiplex competition assay using multiple antibodies against a neutralizing epitope serves this purpose.

EXAMPLES

Example 1. Antigen and Antibodies DNA Conjugation

The following examples demonstrate the feasibility of the methods and systems described herein, such as a multiplex competition assay. A library of Zika virus (ZIKV) antibodies was used to demonstrate that such assays can successfully discriminate and differentiate disease states such as ZIKV and dengue virus (DENV) infections.

In order to install DNA barcodes on antigens to form antigen probes, purified recombinant Zika virus (ZIKV) NS1 protein was obtained from Meridian Life Sciences. 50 µL of ZIKV NS1 protein was taken and subjected to buffer exchange with phosphate buffer saline (PBS) on a zeba spin column (Thermo Fischer). Then, 2 mg (Sulfo-SMCC (sulfo-succinimidyl 4-(N-maleimidomethyl)cyclohexane-1-carboxylate)) was solubilized in 115 µL of dimethyl sulfoxide (DMSO). Sulfo-SMCC is a small molecule cross-linker that can activate lysine residues on antigens with succinimidyl functional group. In this case, the protein was activated with sulfo-SMCC at excess. After incubation at room temperature for 2 hours, zeba spin columns were used to remove excess SMCC from the protein-SMCC. Then, thiolated-DNA barcodes (approx. 50 bp) were installed onto the maleimde part. As such, the sulfo-SMCC served as a cross-linker for coupling the DNA barcodes onto the proteins. Similarly, SMCC can also be used to install DNA barcodes onto the antibodies. The ZIKV antibodies were purchased from Absolute Antibodies and The Native Antigen Company.

Sequences and modifications on the DNA used herein are described below in Table 1.

TABLE 1

| SEQ ID NO: | Name | DNA Sequence | 5' modification | 3' modification |
|---|---|---|---|---|
| 1 | 1B | TCACGGTAGCATAAGGT GCAAGATAATACTCTCG CAGCAC | phosphory-lation | Thiolation |
| 2 | 1A | CAGGTAGTAGTACGTCT GTTTCACGATGAGACTG GATGAA | Thiolation | NA |
| 3 | 2A | GGCCTCCTCCAATTAAA GAATCACGATGAGACTG GATGAA | Thiolation | NA |
| 4 | 3A | GGATCACTCCAACTAGA CTATCACGATGAGACTG GATGAA | Thiolation | NA |
| 5 | 4A | CCCTCGTACACAATGGA TAATCACGATGAGACTG GATGAA | Thiolation | NA |

Example 2. Multiplex Competition Assays

Once the conjugates were successfully synthesized, the multiplex competition assay was performed. Given that the antibodies were anti-NS1 antibodies, the antibody-DNA conjugates had the propensity to bind onto the NS1-DNA conjugates (FIG. 4 and FIG. 5). As such, in the absence of any other interfering factors, the antibody-DNA and NS1-DNA conjugates formed an immunocomplex upon incubation. Due to the formation of such immunocomplexes, the DNA barcodes on antibodies and NS1 were thus positioned in close proximity. Then, a connector oligonucleotide was added that complemented a portion of the sequence on the antibodies and another portion of sequence on the NS1 antigen probes to bridge the two barcodes together. Then, ligase was added to reunite the two barcode into a full length amplicon, which was amplified with primer pairs by real-time qPCR. Given that all of the antibodies used in this example bind onto NS1 antigens, the full length amplicon for each of the antibodies shared a common portion. In other words, antibody #1 was represented by 1A-1B, antibody #2 was represented by 2A-1B, antibody #3 was represented by 3A-1B and antibody #4 was represented by 4A-1B. Thus, when it comes to PCR amplification or real-time qPCR quantitation, one could use 1F and 1R primers for amplification of 1A-1B, 2F and 1R primers for 2A-1B, 3F and 1R primers for 3A-1B and 4F and 1R primers for 4A-1B. Despite each amplicon only differing from one another in half of the amplicon, it was distinct enough to be differentiated by PCR reactions.

1 µL of each patient serum sample was incubated with 2 µL of a solution that contained NS1-1B conjugates, oligonucleotides (as blocking agent) and IgG (as blocking agent) in buffer C (PBS, 1% BSA). The mixtures were incubated at 30° C. for 20 minutes. Then, 2 µL of the above mixture was transferred to another 2 µL of solution that contained Ab1-1A, Ab2-2A, Ab3-3A and Ab4-4A in buffer C, and incubated at 37° C. for 30 minutes. Then, a ligation mixture (containing connector, ligase, and co-factor for the ligase) was added, and the resulting solution was incubated at 30° C. for 15 minutes. Next, 25 µL of the ligation product was transferred to another 254, of solution that contained (1F, 2F, 3F, 4F and 1R primers, dNTP, polymerase, Mg2+ in PCR buffer). Thus, all DNA amplicons were simultaneously amplified at this step. Finally, 8.5 µL of each PCR amplification product was combined with a 11.5 µL qPCR reaction mixture. Each of the qPCR reaction mixtures only contained one primer pair. For instance, one qPCR reaction mixture contained 1F/1R, another 2F/1R, another 3F/1R, and the last one 4F/1R. The four competition reactions were accessed in four different wells by qPCR.

This method was employed to test for control, dengue virus-infected and Zika virus infected patient samples and showed strong competition was detected in the Zika patient only. In addition, different patients had distinct Zika antibodies competition profiles (FIG. 6 and FIG. 7).

Figure 6:
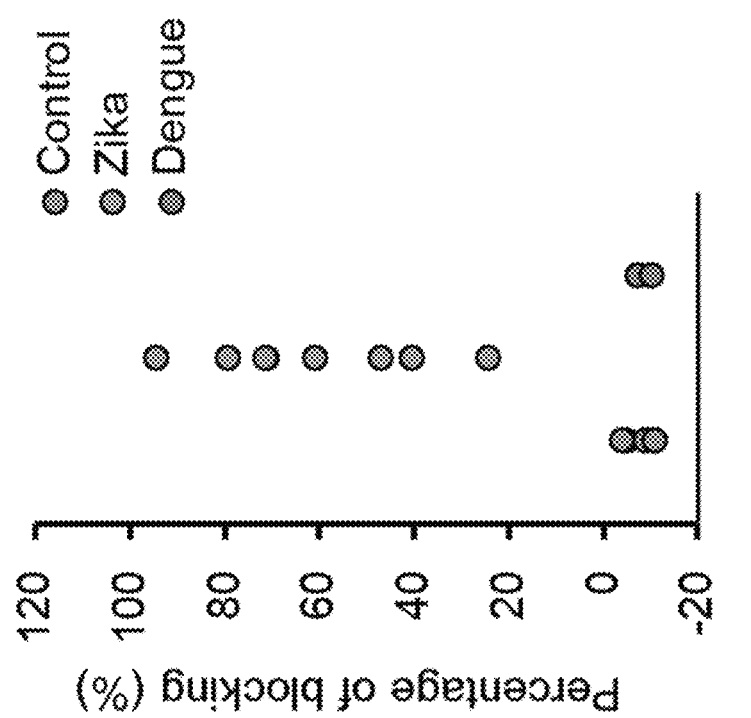
FIG. 6 is a chart depicting data generated by an assay in accordance with some embodiments.

The data shown in FIG. 6 demonstrate that the multiplex competition assay concept is feasible. It was first demonstrated with a ligation-based PCR assay. Here, Zika NS1 antigens and anti-Zika NS1 antibodies were used. One half of a DNA barcode (1B) was installed on the Zika NS1 antigen, and another half of DNA barcode was installed on the anti-Zika NS1 antibodies (1A). It was expected that in the absence of competition event, strong signal generation from PCR reaction would be seen using 1F and 1R primers. A strong decrease in signals was seen where there was a competition event. This was due to the fact that the two probes were separated, and thus there was no ligation event and no PCR amplifiable signals. When "Control" and "Dengue" patient serum samples were assayed, the signals did not decrease. On the contrary, when Zika patient samples were assayed, almost a complete loss of signal was observed. These results unambiguously show that ligation-based competition assay is feasible, and works for the detection or discrimination of Zika virus and dengue virus.

Figure 7:
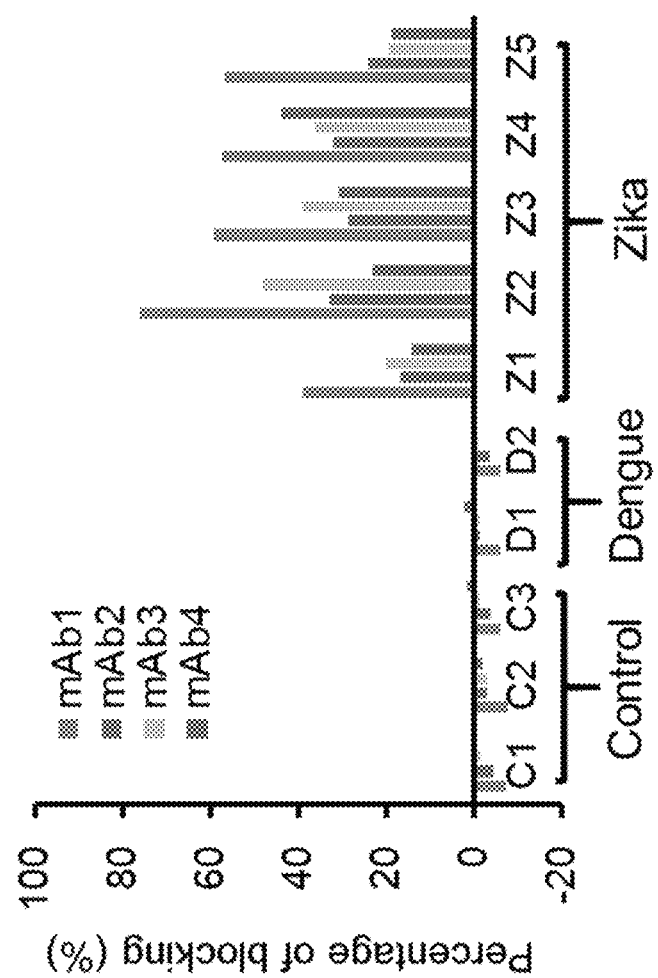
FIG. 7 is a chart depicting data generated by an assay using various antibodies in accordance with some embodiments.

The data shown in FIG. 7 further demonstrated that multiplex competition assays are experimentally feasible, and expanded the previous Zika system by incorporating several additional antibodies with additional DNA barcodes. In this case, antibody 2 was coded with DNA 2A, antibody 3 was coded with DNA 3A and antibody 4 was coded with DNA 4A. As expected, no loss of signal was observed for control and dengue patient samples. For Zika patient serum samples, a loss of signal was seen due to competition events for all four antibodies. Furthermore, different Zika patient serum samples showed different antibody profiles.

Example 3. Data Analysis

The background signals for the multiplex competition assays may be established by comparing signal intensities between a buffer only control and the samples. As opposed to traditional assays, the buffer showed a strong signal, and the samples containing the target antibodies had weaker signals, reinforcing the concept of competition assay. The assay signals may be reported by the magnitude of signal loss.

It may be desirable to normalize the assay signals such that signals intensities from different sequence pairs (different antibodies) are cross-comparable. Another "control" may further be assayed. Here instead of using anti-Zika NS1-DNA conjugates as antigen probes. Isotype IgG-DNA conjugates are used as antigen probes. In this case, since the isotype IgG-DNA conjugate does not engage with NS1-DNA conjugate, the signal is relatively weak. Then, the delta of signals between anti-Zika NS1-DNA conjugates and isotype IgG-DNA conjugates in buffer only control is noted to establish the range of signals. Once the range is identified, the observe signals are normalized by dividing the range. Thus, the competition may be expressed as percentages. This allows for accounting for difference in PCR efficiency and other unknown analytical factors between different sequence pairs. This analytical approach makes the signals more comparable across the entire multiplex panel.

Example 4. Assay Optimization

To further improve the sensitivity of the multiplex competition assay, it was further demonstrated that the NS1-DNA conjugates but not Ab-DNA conjugates had a determinant impact on overall assay sensitivity (Table 2). It was observed that lower NS1-DNA conjugates led to stronger assay signals. The lower amount of NS1-DNA conjugate, the easier it is for patient antibodies to completely occupy the binding sites. In other words, at lower NS1-DNA conjugate concentrations, less patient antibodies are required to block the epitope. As such, at the same patient antibody level, a lower NS1-DNA conjugate concentration leads to stronger assay signals.

TABLE 2

|  | NS1-DNA conjugates | | Ab-DNA conjugates | |
| --- | --- | --- | --- | --- |
|  | No dilution | 4-fold dilution | No dilution | 4-fold dilution |
| Control | −0.45 | −0.27 | −4.45 | −0.28 |
| Zika | 2.08 | 4.46 | 2.10 | 2.00 |

The data in Table 2 show that concentrations of antigen-DNA conjugates may be determinant for assay signal intensities. When antigen-DNA conjugates (NS1-1B) were decreased by 4-fold, a strong increase in signal was observed. When antibody-DNA conjugates were decreased by 4-fold, a significant increase in signal was not observed. This may be explained by the fact that the lower amount of antigen-DNA conjugate used, the easier it may be for patient antibodies to completely occupy the binding sites. Thus, a strong competition is realized, which leads to strong competition assay signal. This innovation was developed at least in part through the new type of ligation-based PCR competition assay described herein to multiplexedly assay epitope binding patterns.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

All references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

REFERENCES

The following references are cited throughout this disclosure, and are each incorporated herein by reference in their entirety.
1. Wilkinson E, Engelbrecht S, de Oliveira T (2015) History and origin of the HIV-1 subtype C epidemic in South Africa and the greater southern African region. Sci Rep 5:16897.
2. Lessler J., et al (2016) Assessing the global threat from Zika virus. Science. 353: aaf8160.
3. Mishra N, et al (2018) Diagnosis of Zika Virus Infection by Peptide Array and Enzyme-Linked Immunosorbent Assay. MBio. 6; 9(2). pii: e00095-18.
4. Tarek A. Ahmadab, Amrou E. Eweidac, Salah A. Sheweitac (2016) B-cell epitope mapping for the design of vaccines and effective diagnostics. Trials in Vaccinology. 5, 71-83
5. Moreira G M, Führer V, Hust M (2018) Epitope Mapping by Phage Display. Methods Mol Biol. 1701:497-518.
6. Opuni K F M, Al-Majdoub M, Yefremova Y, El-Kased R F, Koy C, Glocker M O (2018) Mass spectrometric epitope mapping. Mass Spectrom Rev. 37(2):229-241.
7. Chen X., et al. (2015) Structural Basis for Antigen Recognition by Transglutaminase 2-specific Autoantibodies in Celiac Disease. J Biol Chem. 290(35): 21365-21375.
8. Cho H S, Mason K, Ramyar K X, Stanley A M, Gabelli S B, Denney D W Jr, Leahy D J (2003). Structure of the extracellular region of HER2 alone and in complex with the Herceptin Fab. Nature. 421(6924):756-60.
9. Robert C. Ladner. (2007) Mapping the Epitopes of Antibodies. Biotechnology and Genetic Engineering Reviews. 24:1-30.

10. Greenbaum C. J., et al (1991) Insulin antibodies and insulin autoantibodies. Diabetes Medicine. 8(2): 97-105.
11. Hutchings C J, Koglin M, Marshall F H. (2010) Therapeutic antibodies directed at G protein-coupled receptors. MAbs. 2(6):594-606.
12. Kwak J W, Yoon C S. A convenient method for epitope competition analysis of two monoclonal antibodies for their antigen binding. (1996) J Immunol Methods. 191 (1):49-54.
13. Mousa J J., et al. Structural basis for nonneutralizing antibody competition at antigenic site II of the respiratory syncytial virus fusion protein. (2016) Proc Natl Acad Sci USA. 113(44):E6849-E6858.
12. F. R. Spinelli, G. Valesini. (2013) Immunogenicity of anti-tumour necrosis factor drugs in rheumatic diseases. Clin Exp Rheumatol 31: 954-963.
13. Lee A J, Bhattacharya R, Scheuermann R H, Pickett B E. Identification of diagnostic peptide regions that distinguish Zika virus from related mosquito-borne Flaviviruses. (2017) PLoS One. 12(5):e0178199.
14. Abdiche Y N, Malashock D S, Pinkerton A, Pons J. Exploring blocking assays using Octet, ProteOn, and Biacore biosensors (2009) Anal Biochem. 386(2):172-80.
15. Martin Lundberg, Anna Eriksson, Bonnie Tran, Erika Assarsson, Simon Fredriksson. Homogeneous antibody-based proximity extension assays provide sensitive and specific detection of low-abundant proteins in human blood. (2011) Nucleic Acids Research, 39(15): e102.

What is claimed is:

1. An assay method, comprising:
    (a) providing a first multiplex affinity probe comprising a first affinity binding agent and a first DNA barcode probe;
    (b) providing a second multiplex affinity probe comprising a second affinity binding agent and a second DNA barcode probe;
    (c) providing an antigen probe comprising a first epitope recognizable by the first affinity binding agent, a second epitope recognizable by the second affinity binding agent, and a third DNA barcode probe;
    (d) contacting a biological sample with the antigen probe, wherein a first target antibody binds to the first epitope to form a first target antibody epitope complex if the biological sample comprises the first target antibody, and wherein a second target antibody binds to the second epitope to form a second target antibody epitope complex if the biological sample comprises the second target antibody;
    (e) contacting the biological sample with the first and second multiplex affinity probes, wherein the first multiplex affinity probe binds to the first epitope to form a first multiplex affinity probe epitope complex if the biological sample does not comprise the first target antibody, and wherein the second multiplex affinity probe binds to the second epitope to form a second multiplex affinity probe epitope complex if the biological sample does not comprise the second target antibody; and
    (f) detecting the presence or absence of the first and second multiplex affinity probe epitope complexes using a polymerase chain reaction (PCR),
    wherein the first and second affinity binding agent comprises an antibody or scFv thereof.

2. The assay method of claim 1, wherein detecting the presence or absence of the first and second multiplex affinity probe epitope complexes comprises detecting the presence or absence of the first and second DNA barcode probes.

3. The assay method of claim 1, wherein the biological sample comprises the first target antibody and/or the second target antibody, wherein the first target antibody binds to the first epitope to form a first target antibody epitope complex and wherein the second target antibody binds to the second epitope to form a second target antibody epitope complex, wherein the first multiplex affinity probe binds to the first epitope to form a first multiplex affinity probe epitope complex and/or wherein the second multiplex affinity probe binds to the second epitope to form a second multiplex affinity probe epitope complex, and wherein detecting the presence or absence of the first and second multiplex affinity probe epitope complexes comprises detecting the presence of the first and/or second multiplex affinity probe epitope complexes.

4. The assay method of claim 1, wherein the antigen probe comprises a recombinant protein comprising the first and second epitopes.

5. The assay method of claim 1, further comprising hybridizing the first and third DNA barcode probes with a first connector nucleic acid, wherein the first connector nucleic acid comprises sequences complementary to at least a portion of the first and third DNA barcode probes.

6. The assay method of claim 5, further comprising ligating the first and third DNA barcode probes together to form a first ligation product.

7. The assay method of claim 6, further comprising amplifying a region of the first ligation product using amplification primers specific for the first and third DNA barcode probes, to produce a first amplification product; and detecting or quantifying the first amplification product.

8. The assay method of claim 1, further comprising hybridizing the second and third DNA barcode probes with a second connector nucleic acid, wherein the second connector nucleic acid comprises sequences complementary to at least a portion of the second and third DNA barcode probes.

9. The assay method of claim 8, further comprising ligating the second and third DNA barcode probes together to form a second ligation product.

10. The assay method of claim 9, further comprising amplifying a region of the second ligation product using amplification primers specific for the second and third DNA barcode probes, to produce a second amplification product; and detecting or quantifying the second amplification product.

11. The assay method of claim 1, further comprising hybridizing the first and third DNA barcode probes with each other, wherein the first and third DNA barcode probes are complementary or each comprise a complementary region with each other, and/or further comprising hybridizing the second and third DNA barcode probes with each other, wherein the second and third DNA barcode probes are complementary or each comprise a complementary region with each other.

12. The assay method of claim 11, further comprising contacting the first and third DNA barcode probes with a DNA polymerase, wherein the DNA polymerase forms a first double-stranded DNA molecule from the first and third DNA barcode probes, and/or further comprising contacting the second and third DNA barcode probes with a DNA polymerase, wherein the DNA polymerase forms a second double-stranded DNA molecule from the second and third DNA barcode probes.

13. The assay method of claim 12, further comprising amplifying the first double stranded DNA molecule to produce a first amplification product, and/or further comprising amplifying the second double stranded DNA molecule to produce a second amplification product; and detecting or quantifying the first amplification product, and/or detecting or quantifying the second amplification product.

14. The assay method of claim 1, wherein the first and second multiplex affinity probes are each bound or conjugated to a solid support and/or the antigen probe is bound or conjugated to a solid support or substrate.

15. The assay method of claim 1, wherein the presence of the first or second target antibodies in the biological sample are indicative of the presence of a disease.

16. The assay method of claim 15, wherein the disease comprises a cancer, a hematological disease, diabetes, an autoimmune disease, a dengue virus infection or Zika virus infection.

17. The assay method of claim 1, wherein the biological sample comprises whole blood, serum, plasma, urine, saliva, breast milk, nasal fluids, or cerebrospinal fluid.

\* \* \* \* \*

SEQUENCE LISTING

```
<160> NUMBER OF SEQ ID NOS: 5

<210> SEQ ID NO 1
<211> LENGTH: 40
<212> TYPE: DNA
<213> ORGANISM: Artificial Sequence
<220> FEATURE:
<223> OTHER INFORMATION: Barcode 1B
<220> FEATURE:
<221> NAME/KEY: 5'_phosphorylation
<222> LOCATION: (1)..(1)
<220> FEATURE:
<221> NAME/KEY: 3'_thiolation
<222> LOCATION: (40)..(40)

<400> SEQUENCE: 1
tcacggtagc ataaggtgca agataatact ctcgcagcac                            40

<210> SEQ ID NO 2
<211> LENGTH: 40
<212> TYPE: DNA
<213> ORGANISM: Artificial Sequence
<220> FEATURE:
<223> OTHER INFORMATION: Barcode 1A
<220> FEATURE:
<221> NAME/KEY: 5'_thiolation
<222> LOCATION: (1)..(1)

<400> SEQUENCE: 2
caggtagtag tacgtctgtt tcacgatgag actggatgaa                            40

<210> SEQ ID NO 3
<211> LENGTH: 40
<212> TYPE: DNA
<213> ORGANISM: Artificial Sequence
<220> FEATURE:
<223> OTHER INFORMATION: Barcode 2A
<220> FEATURE:
<221> NAME/KEY: 5'_thiolation
<222> LOCATION: (1)..(1)

<400> SEQUENCE: 3
ggcctcctcc aattaaagaa tcacgatgag actggatgaa                            40

<210> SEQ ID NO 4
<211> LENGTH: 40
<212> TYPE: DNA
<213> ORGANISM: Artificial Sequence
<220> FEATURE:
<223> OTHER INFORMATION: Barcode 3A
<220> FEATURE:
<221> NAME/KEY: 5'_thiolation
<222> LOCATION: (1)..(1)
```

```
<400> SEQUENCE: 4
ggatcactcc aactagacta tcacgatgag actggatgaa                    40

<210> SEQ ID NO 5
<211> LENGTH: 40
<212> TYPE: DNA
<213> ORGANISM: Artificial Sequence
<220> FEATURE:
<223> OTHER INFORMATION: Barcode 4A
<220> FEATURE:
<221> NAME/KEY: 5'_thiolation
<222> LOCATION: (1)..(1)

<400> SEQUENCE: 5
ccctcgtaca caatggataa tcacgatgag actggatgaa                    40
```